United States Patent
Kovacovsky et al.

(10) Patent No.: US 10,334,190 B2
(45) Date of Patent: *Jun. 25, 2019

(54) METHODS AND APPARATUS FOR SUPERPIXEL MODULATION

(71) Applicant: Photoneo, s.r.o., Bratislava (SK)

(72) Inventors: Tomas Kovacovsky, Bratislava (SK); Michal Maly, Lutila (SK); Jan Zizka, Bratislava (SK)

(73) Assignee: Photoneo, s.r.o., Bratislava (SK)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,444

(22) Filed: Jan. 15, 2018

(65) Prior Publication Data

US 2018/0139398 A1 May 17, 2018

Related U.S. Application Data

(63) Continuation of application No. 15/115,270, filed as application No. PCT/IB2015/051551 on Mar. 3, 2015, now Pat. No. 9,912,884.

(Continued)

(51) Int. Cl.
*H04N 5/235* (2006.01)
*H04N 13/20* (2018.01)
(Continued)

(52) U.S. Cl.
CPC .......... *H04N 5/353* (2013.01); *G01S 7/4863* (2013.01); *G01S 7/4868* (2013.01); *G01S 7/497* (2013.01); *G01S 17/89* (2013.01); *G06T 7/80* (2017.01); *H04N 5/2352* (2013.01); *H04N 5/2354* (2013.01); *H04N 5/378* (2013.01); *H04N 13/246* (2018.05); *H04N 13/254* (2018.05); *H04N 13/296* (2018.05)

(58) Field of Classification Search
CPC ...................................................... H04N 5/353
USPC .......... 348/46; 435/6.16, 6.18, 287.2; 506/9; 536/23.1, 24.3
See application file for complete search history.

(56) References Cited

U.S. PATENT DOCUMENTS 6,847,070 B2    1/2005  Fox
2010/0073462 A1*  3/2010  Lee ........................ H04N 5/347
                                                                    348/46

(Continued)

OTHER PUBLICATIONS

Geng, J., Structured-light 3D surface imaging: a tutorial; published in Advances in Optics and Photonics, vol. 3, Issue 2, pp. 128-160, (2011), doi: 10.1364/AOP.3.000128.

(Continued)

*Primary Examiner* — Christopher S Kelley
*Assistant Examiner* — Asmamaw G Tarko
(74) *Attorney, Agent, or Firm* — Stephen R. Otis

(57) ABSTRACT

In illustrative implementations, a set of separate modulation signals simultaneously modulates a plurality of pixels in a superpixel by a set of separate modulation signals, such that each pixel in the superpixel is modulated by a modulation signal that causes sensitivity of the pixel to vary over time. Each superpixel comprises multiple pixels. In some implementations, the sensitivity of a pixel to incident light is controlled by storage modulation or by light modulation. In some implementations, this invention is used for 3D scanning, i.e., for detection of the 3D position of points in a scene.

20 Claims, 19 Drawing Sheets

Related U.S. Application Data

(60) Provisional application No. 61/947,282, filed on Mar. 3, 2014.

(51) Int. Cl.
*H04N 5/353* (2011.01)
*H04N 5/378* (2011.01)
*C12Q 1/68* (2018.01)
*G01S 17/89* (2006.01)
*G01S 7/486* (2006.01)
*G01S 7/497* (2006.01)
*G06T 7/80* (2017.01)
*H04N 13/246* (2018.01)
*H04N 13/254* (2018.01)
*H04N 13/296* (2018.01)

(56) References Cited

U.S. PATENT DOCUMENTS

2012/0120096 A1* 5/2012 Johnson ............... G09G 3/2048
345/596
2012/0274744 A1* 11/2012 Wan ................... H04N 5/37452
348/46
2012/0287242 A1* 11/2012 Gilboa ................... G01S 17/89
348/46
2013/0088726 A1* 4/2013 Goyal ................... G01S 7/4866
356/634

OTHER PUBLICATIONS

Kimachi, A., et al., Real-Time Phase-Stamp Range Finder Using Correlation Image Sensor; published in IEEE Sensors Journal, vol. 9, Issue 12, pp. 1784-1792 , Dec. 2009.

Wan, G., et al., CMOS Image Sensors With Multi-Bucket Pixels for Computational Photography; published in IEEE Journal of Solid-State Circuits, vol. 47, Issue 4, pp. 1031-1042, Feb. 2012.

Yoon, H. et al., A CMOS Image Sensor With in-Pixel Two-Stage Charge Transfer for Fluorescence Lifetime Imaging, published in IEEE Transactions on Electron Devices, vol. 56, Issue 2, pp. 214-221, Feb. 2009.

Goddyn, L., et al., Binary gray codes with long bit runs; published in the Electronic Journal of Combinatorics, vol. 10 (2003), Research Paper #R27.

Silva, J., et al., Pattern codification strategies in structured light systems; published in Pattern Recognition 37 (2004) pp. 827-849.

* cited by examiner

METHODS AND APPARATUS FOR SUPERPIXEL MODULATION

RELATED APPLICATIONS

This application is a continuation of U.S. application Ser. No. 15/115,270, which was the National Stage of International Application No. PCT/IB2015/051551 filed Mar. 3, 2015, which claims the benefit of U.S. Provisional Application No. 61/947,282, filed Mar. 3, 2014 (the "Provisional Application").

FIELD OF THE TECHNOLOGY

The present invention relates generally to superpixel modulation.

SUMMARY

In exemplary implementations of this invention, a light sensor includes superpixels. Each superpixel comprises multiple pixels, such that each pixel in the superpixel is a horizontal, vertical or diagonal neighbor of at least one other pixel in the superpixel.

The pixels of the light sensor also include pixel sets. Each pixel set comprises multiple pixels to which a single modulation signal is applied. In many cases, the pixels of a given pixel set are not horizontal, vertical or diagonal neighbors of each other.

Each of the pixel sets is modulated by a separate modulation signal.

Each superpixel includes at least one pixel from each of the pixel sets. Thus, different pixels in each superpixel are separately modulated.

For example, in some cases: (1) a light sensor includes n pixel sets; (2) each superpixel in the light sensor has n pixels, such that each pixel in the superpixel is an element of a different pixel set; and (3) n separate modulation signals are simultaneously applied to the pixels in the light sensor, one separate modulation signal per pixel set. In this example, for each superpixel, n separate modulation signals are simultaneously applied to the n pixels of the superpixel, one modulation signal per pixel, In illustrative implementations, the n separate modulations signals together comprise an n-bit binary code, such as n-bit binary gray code. Each of the modulation signals corresponds to a bit of the code. For example, in some cases: (1) each superpixel has n pixels; (2) n separate modulation signals are applied to the n pixels, one modulation signal per pixel; (3) together the n modulations signals comprise an 9-bit binary gray code; and (4) each of the n modulation signals corresponds to a bit of the code.

All $2^n$ permutations of the n-bit code are applied during each camera frame. Thus, each camera frame is divided into $2^n$ time intervals (timeslots). Each permutation of the code corresponds to a unique timeslot during a single camera frame.

In illustrative implementations, a set of separate modulation signals simultaneously modulate a plurality of pixels in a superpixel, such that each pixel in the superpixel is modulated by a modulation signal that causes sensitivity of the pixel to vary over time.

In some implementations, this invention is used for 3D scanning, i.e., for detection of the 3D position of points in a scene.

In some cases, the 3D scanning is implemented as follows: A rotating mirror causes a plane of laser light to sweep across a scene during each camera frame. Because the mirror rotates, the angle of the plane of laser light varies as a function of time during each sweep. The mirror is at a particular angle when the plane of laser light hits the point in the scene from which light directly reflects to that pixel. At this particular angle of the plane of laser light, the incident light intensity for that pixel reaches a maximum for that frame. The modulation pattern affects the pixel's response to incident light, and thereby uniquely identifies (i) the timeslot during which the maximum intensity of incident light strikes the pixel and (ii) the angle of the plane of laser light during this timeslot. A computer uses the timeslot to access a lookup table to determine the 3D position of the scene point.

The lookup table is computed for each pixel by triangulation, during earlier calibration. Specifically, in some cases, the image sensor, rotational axis of the rotating mirror, and pixel ray for the superpixel are fixed relative to each other. The pixel ray is the half-line along which light must travel in order to reach the center of the superpixel. A computer calculates the angle of the plane of laser light for a given superpixel, based on the timeslot at which incident light for the given superpixel reaches a maximum. The 3D scene point that reflects light to the given superpixel is positioned at the intersection of (i) the pixel ray for the given superpixel and (ii) the plane of laser light. A computer calculates the 3D coordinates of this intersection by triangulation, based on the known position of the superpixel, pixel ray for the superpixel, and light source and based on the computed angle of the plane of laser light.

An advantage of the present invention is that, in illustrative implementations, all n modulation signals that comprise an n-bit code are recorded by an n-pixel superpixel during a single frame of a camera. In contrast, during conventional time-multiplexed structured illumination: (a) light source is modulated by one modulation signal during each frame; and (b) the n separate modulation signals that comprise the n-bit code are applied during n separate frames of the camera, one modulation signal per frame. Thus, in illustrative implementations, this invention captures in a single camera frame the same type of data as is captured during multiple camera frames with time-multiplexed structured illumination. Capturing all of the data in a single frame (in illustrative implementations of the present invention) rather than in multiple frames (as in conventional time-multiplexed structured illumination) has the desirable effect of reducing distortion and artifacts in 3D sensing that are caused by motion.

In some implementations of this invention, the sensitivity of a pixel to incident light is controlled by storage modulation. Storage modulation is achieved by using either a single storage device per pixel, or by using multiple storage devices per pixel.

In single storage cases, each pixel transfers charge to only one storage device during the exposure time of a single camera frame. The storage device receives charge only from that pixel, and not from any other pixels, during the exposure time of a single camera frame. Modulation signals cause a photodiode in each pixel to transfer charge to the single storage device multiple times during a single camera frame, and to drain charge, without saving it for later readout, at multiple other times during the same camera frame.

In multiple storage cases, each pixel transfers charge to multiple storage device during the exposure time of a single camera frame. These multiple storage device receive charge only from that pixel, and not from any other pixels, during the exposure time of a single camera frame. Modulation signals cause a photodiode in each pixel to transfer charge to transfer charge to different storage devices, out of the multiple storage devices, at multiple times during the exposure time of a single camera frame, or to drain charge, without saving it for later readout, at multiple other times during the same camera frame.

In some implementations of this invention, pixel modulation occurs by light modulation. In light modulation implementations, the system includes an SLM (spatial light modulator) that is either transmissive or reflective. The SLM selectively attenuates light from a scene, thereby selectively controlling the intensity of light incident on a pixel. For example, in some cases: (a) a reflective SLM selectively reflects light from the scene, causing different sets of pixels in a superpixel to receive reflected light from the scene at different times during a single camera exposure; and (b) the reflective SLM comprises a DMD (digital micromirror device) or a reflective LCOS (liquid crystal on silicon) device. For example, in other cases: (a) light passing through a transmissive SLM is selectively attenuated by the SLM, causing different sets of pixels in a superpixel to receive light from the scene at different times during a single camera exposure; and (b) the transmissive SLM comprises an LCD (liquid crystal device) or ferromagnetic shutters.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

In FIG. 24A, the transmissive SLM is adjacent to the image sensor plane. In FIG. 24B, an imaging lens is positioned between the transmissive SLM and the image sensor plane. In FIG. 24C, a field lens and relay lens are positioned between the transmissive SLM and the image sensor plane.

The above Figures (except FIG. 25) show some illustrative implementations of this invention, or provide information that relates to those implementations. However, this invention may be implemented in many other ways.

DETAILED DESCRIPTION

Superpixels and Pixel Sets

In illustrative implementations of this invention, a light sensor includes superpixels.

Separate modulation signals are applied to different sets of pixels in the light sensor. As used herein, a set of pixels to which a particular modulation signal is applied is sometimes called a "modulation pixel set" or simply "pixel set".

Each pixel set comprises multiple pixels.

Each superpixel includes at least one pixel from each of the pixel sets.

Figure 1:
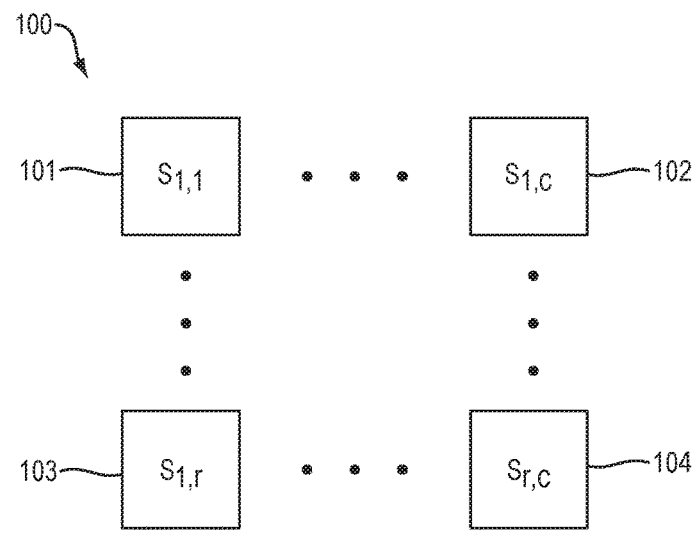
FIG. 1 is a diagram that shows a matrix of superpixels.

FIG. 1 is a diagram that shows a matrix of superpixels, in an illustrative implementation of this invention. In the example shown in FIG. 1, a light sensor comprises matrix 100 of superpixels, such as superpixels 101, 102, 103, 104. The matrix 100 has r rows and c columns. The total number of superpixels in the matrix is r*c=k.

Figure 2:
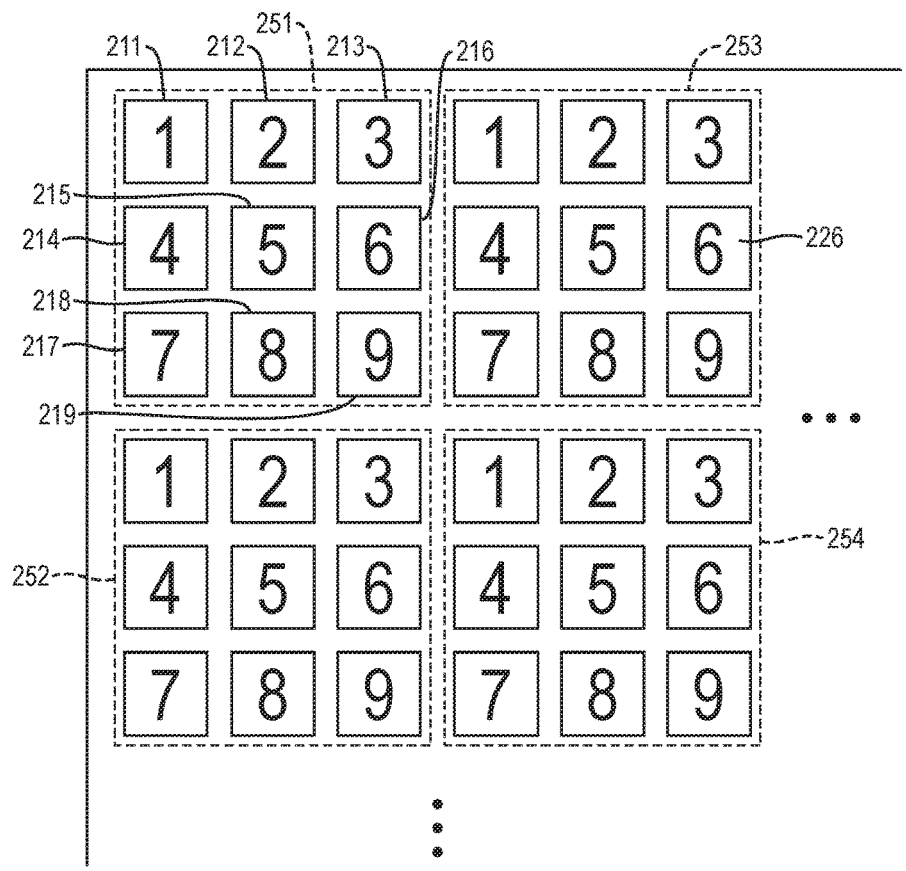
FIG. 2 is a diagram that shows individual pixels within superpixels.

FIG. 2 is a diagram that shows individual pixels within superpixels, in an illustrative implementation of this invention. FIG. 2 shows four superpixels 251, 252, 253, 254 in the upper left corner of a matrix of superpixels. Each of the four superpixels comprises 9 pixels. For example, superpixel 251 comprises pixels 211, 212, 213, 214, 215, 216, 217, 218, 219.

In the example shown in FIG. 2, there are nine pixel sets. The pixels in the first pixel set are labeled "1". Likewise, the pixels in the second, third, fourth, fifth, sixth, seventh, eighth and ninth pixel sets are labeled "2", "3", "4", "5", "6", "7", "8", and "9", respectively. (These numerical labels are used in FIG. 2 to facilitate explanation; but in actual practice, the pixels are not labeled in this manner.)

In FIG. 2, each superpixel includes one pixel from each set.

In illustrative implementations, the pixels in each superpixel are sufficiently small and sufficiently close together that light incident on the photodiodes of the pixels in the superpixel is locally homogeneous—that is, within a single superpixel, spatial variation in intensity of incident light is not substantial.

(However, in some cases: (a) the light sensor itself includes spatial light modulators—such as an LCD—for selectively modulating the intensity of incoming light; and (b) the light incident on the photodiodes of the superpixel is locally homogeneous if the effect of the spatial light modulators is subtracted, but is not locally homogeneous if the effect of the spatial light modulators is taken into account.)

Depending on the particular implementation, the spatial distribution of pixel sets within a light sensor may vary. In many cases, it is preferable for the pixel sets to be spatially distributed in a repeating pattern. For example, in some cases, 9 pixel sets are used in a light sensor, and each superpixel is a 3×3 pixel square, which is an easily repeatable pattern. For example, in FIG. 2, the following spatial pattern of 9 pixel sets occurs in superpixel 251: pixels from pixel sets 1, 2, 3 are in the top row of the superpixel, pixels for pixel sets 4, 5, 6 are in the middle row of the superpixel, and pixels for pixel sets 7, 8, 9 are in the bottom row of the superpixel. This spatial pattern repeats in superpixels 252, 253, 254. Or, for example, in some cases, a 3-pixel superpixel in an "L" shape is used: stacking an upright "L" and a bottom-up "L" gives a rectangle and thus produces a repeatable pattern.

Depending on the particular implementation, any shape of superpixels may be used. For example, in some cases, triangular or hexagonal superpixels are used. In some cases, the superpixels has a linear shape, such as horizontal (e.g., [12345][12345][12345]), and vertical (e.g., $[12345]^T$ $[12345]^T[12345]^T$) However, in some cases, using a line-shaped superpixel has a disadvantage: if all "1"s are in one column; this tends in some cases to at least slightly increase the decoding error rate.

In some cases, the position of pixels from different pixel sets (within each superpixel) is rearranged from superpixel to superpixel (e.g. using a few fixed patterns, completely randomizing the order, or using a mathematical permutation).

For example, in some implementations, the spatial distribution of pixels from different sets of pixel sets within each superpixel is randomized in design time, then the random distribution is hardwired. For example, in some cases, randomization produces, for three line-shaped superpixels, a spatial arrangement of pixels from different pixel sets of [13452][35214][41253], rather than [12345][12345] [12345]. Likewise, randomization of position of pixels from different pixel sets is applicable to any shape of superpixel, including square, rectangular, L-shaped, triangular or hexagonal.

In some cases, a multiplexer rearranges the shape or size of superpixels, such that superpixels with different sizes or shapes used at different times (e.g., for different applications, different frames, or at different times within a single frame) or at different regions within a single light sensor. For example, in some cases, a multiplexer reconfigures different superpixel shapes, e.g., 3×3, 4×3, or another shape. For example, in some implementations with CMOS pixels, a multiplexer is placed outside the pixel matrix area and directs separate TX/PD RST control signals to the pixels. Likewise, in some cases, a multiplexer rearranges the position of pixels from different pixel sets within one or more of the superpixels.

As noted above, in some cases, the spatial distribution of different sets of pixels changes from frame to frame. Alternatively, in some cases, the spatial distribution is fixed because of wiring of the pixel circuit.

In many implementations, the different sets of pixels in the imaging sensor are disjoint (i.e., no pixel belongs to more than one of the sets of pixels). Alternatively, different sets of pixels are overlapping. In some cases, a single pixel that is an element of two pixel sets A and B is subjected to a pixel modulation signal that comprises a superposition of the modulation signals for pixel sets A and B.

The size of the superpixel depends on the application. If, for example, a 9 pixel superpixel is not enough for a specific application and a 16 pixel superpixel is too much, a 12 pixel superpixel (4×3 or 3×4) may be used for that specific application. More pixel sets in a superpixel allows for more complicated coding strategies or code sharing. For example, a modulation signal comprising 18-bit gray code may be applied to the pixels of a 6×3 pixel superpixel.

In some use scenarios, spatial compression is achieved by treating each large superpixel as if it comprises smaller superpixels, and then applying modulation signals as follows: Modulation signals corresponding to lower bits of a code are applied to only one pixel per large superpixel, but modulation signals corresponding to higher bits of the code are applied to one pixel per smaller superpixel. For example, in some use scenarios, a 6×3 pixel superpixel is treated as if comprising two 3×3 pixel superpixels. In these use scenarios, a modulation pattern corresponding to each of the 4 lower bits of the 11-bit gray code is applied to just one pixel in the 6×3 superpixel, while modulation patterns corresponding to each of the 7 higher bits of the 11-bit gray code are applied to one pixel in each of the 3×3 superpixels. Spatial compression (by applying lower bits and higher bits in this manner) has many practical advantages. For example, in some 3D depth sensing applications, this spatial compression allows for using multiple higher bit modulation signals to determine, for each large superpixel for each frame, the 3D coordinates for multiple points in a scene. For example, in some implementations that use this spatial compression, a computer calculates 3D coordinates of four scene points, for each frame for each 6×3 superpixel.

In some cases, the actual spatial distribution of pixel sets is hardwired in a fixed pattern. However, even then, in some cases, software is used to effectively vary the spatial distribution of pixel sets from frame to frame, by changing, from frame to frame, which bits of a modulation code are applied to which pixel set.

For example, in some cases: (a) in a first frame, software causes the x-th bit of a modulation signal to be applied to modulate pixel set x; and (b) in a second frame, software causes the x-th bit of a modulation signal to be applied to modulate pixel set y. For example, in some use scenarios: (a) in a first frame, the modulation signal for the first bit of a code is applied to a first pixel set, the modulation signal for the second bit of the code is applied to the second pixel set, and so on, and (b) in a second frame, the first bit of a code is applied to the second pixel set, the modulation signal for the second bit of the code is applied to the third pixel set, and so on. Thus, in this approach, the permutation of assignments (from code bits to pixel sets) varies from frame to frame. In some cases, the same permutation of assignments (of code bits to pixel sets) is used in all frames. In other cases, different permutations of assignments (of code bits to pixel sets) are applied in different frames in a fixed order. In yet other cases, a different random permutation of assignments (of code bits to pixel sets) is used in each frame.

Here is a non-limiting example of varying the permutation of assignments (of code bits to pixel sets). For a 5-bit code, there are 5! (factorial) different permutations of assignments of code bits to pixel sets. Different permutations are used in different frames. For example, (a) in a first frame, a first permutation is used, which maps bit 1 to pixel set 1, bit 2 to pixel set 2, bit 3 to pixel set 3, bit 4 to pixel set 4, and bit 5 to pixel set 5; and (b) in a second frame, a second permutation is used, which maps bit 1 to pixel set 4, bit 2 to pixel set 2, bit 3 to pixel set 5, bit 4 to pixel set 3, and bit 5 to pixel set 1.

In illustrative implementations, each superpixel comprises multiple imaging pixels. Each pixel in the superpixel is a horizontal, vertical or diagonal neighbor of at least one other pixel in the superpixel. In the example shown in FIG. 2, pixel 215 has only two vertical neighbors (pixels 212, 217), only two horizontal neighbors (pixels 214, 216), and only four diagonal neighbors (pixels 211, 213, 217, 219).

In many cases, the pixels of a given pixel set are not horizontal, vertical or diagonal neighbors of each other. For example, in FIG. 2, pixels 216 and 226 are each members of the sixth pixel set. None of the neighboring pixels (i.e. horizontal, vertical or diagonal neighbors) of pixel 216 is a member of the sixth pixel set. Likewise, none of the neighboring pixels (i.e. horizontal, vertical or diagonal neighbors) of pixel 226 is a member of the sixth pixel set.

Modulation Signals

Figure 3:
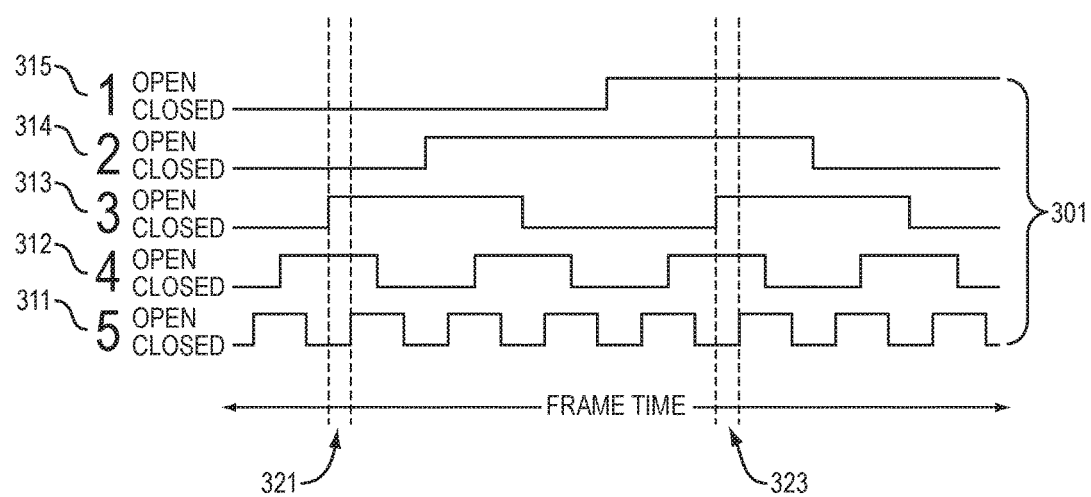
FIG. 3 is a diagram that shows five different modulation signals that are simultaneously applied to five different pixel sets.

FIG. 3 is a diagram that shows five different modulation signals that are simultaneously applied to five different pixel sets during a single frame. In FIG. 3, the five signals 311, 312, 313, 314, 315 together comprise a binary 5-bit gray code. The code is binary because each component of the code has only two allowed values. In FIG. 3, the two allowed values are called "open" and "closed". However, the two allowed values may be called by any name, such as on and off, high and low, or 0 and 1.

In FIG. 3, each of the five modulation signals 311, 312, 313, 314, 315 corresponds to a bit of a 5-bit gray code. The 5-bit gray code has $2^5$ (i.e., 32) permutations of open and closed states of the 5 component signals.

In FIG. 3, all $2^5$ (i.e., 32) permutations of open and closed states of the 5 component signals are applied to the pixel sets, during a single frame of the camera. For a 5-bit code (such as that shown in FIG. 3), a single frame of the camera has $2^5$ (i.e., 32) subintervals, which are sometimes called "timeslots". Each timeslot corresponds to a single permutation of the code. For example, during timeslot 321 in FIG. 3, the permutation is signal 315 closed, signal 314 closed, signal 313 open, signal 312 open and signal 311 closed. In contrast, during timeslot 323 in FIG. 3, the permutation is signal 315 open, signal 314 open, signal 313 open, signal 312 open and signal 311 closed.

In FIG. 3, a unique permutation (of binary states of the 5 component signals of the 5-bit gray code) exists for each of the 32 timeslots. Thus, each permutation (of states of the 5 component signals of the 5-bit gray code) is effectively a "timestamp" that uniquely identifies a timeslot within a frame.

In some implementations of this invention, a 9-bit binary gray code is used. The nine bits of this code are represented by 9 modulation signals. The 9-bit code has $2^9$ (i.e., 512) permutations of open and closed states of the 9 modulation signals. All 512 permutations are applied to pixels in each frame of the camera. Thus, for this 9-bit code, each frame has 512 subintervals, sometimes called timeslots. A unique permutation of the 9-bit code (and thus of the open and closed states of the 9 modulation signals) exists for each of the 512 timeslots. In some cases in which a 9-bit code is used: (a) there are nine pixel sets; (b) the 9 modulation signals are applied to the 9 pixel sets, one signal per pixel set; and (c) each superpixel has 9 pixels, one pixel per pixel sets. Thus, the 9 modulation signals are applied to the 9 pixels in a superpixel, one signal per pixel.

Gray codes are robust against noise, which is advantageous.

Depending on the particular implementation of this invention, the modulation signals are either (a) continuous time (analog), (b) discrete-time, or (c) digital (discrete in both amplitude and time).

For example, in many examples of this invention, digital modulation signals are used. In that case, the amplitude of the modulation signal is treated as being in one of two binary states (e.g., 0 or 1), and the signal changes only at discrete time intervals.

Alternatively, modulation signals are treated as continuous in amplitude. For example, in some cases, a computer normalizes the range of continuous values to an interval [0,1]. In that case, for example, a value of 0.241 may mean that 24.1% of electrons are moved to storage.

There is no limitation of when the signal change can occur in time. In some implementations, the signal changes continuously in time.

In some cases, analog modulation signals are used, which are treated as continuous in both amplitude and time.

In some implementations, the modulation signals are non-periodic. An example of such an aperiodic signal is 00110010101101000011010, which does not have one specific frequency or phase. In other cases, the modulation signals are periodic. Or, in some cases, a periodic signal such as 01010101010101 is applied to a first pixel set, and a second periodic or aperiodic signal (e.g., periodic signal 10000100001000) is applied to a second pixel set.

In some cases, the frequency, phase, or amplitude of the modulation signal for a pixel set changes over the duration of one frame. In other cases, the frequency, phase, or amplitude of the modulation signal for a pixel set is constant within each single frame, but changes from frame to frame.

In illustrative implementations, each modulation signal is applied to only one pixel in each superpixel. Alternatively, a single modulation signal is applied to multiple pixels within a single superpixel.

In illustrative implementations: (a) all pixels which belong to the same pixel set have the same modulation signal; and (b) different pixel sets receive different modulation signals.

Each pixel set receives its own, separate generated pixel modulation signal.

In many use scenarios, the amplitude of each modulation signal varies as a function of time during a single frame. However, in other use scenarios: (a) the amplitude or phase of a modulation signal is constant over time within a single frame, where the constant is different for different pixel sets, or (b) the amplitude or phase of a modulation signal is the same constant for different pixel sets. In other words, this invention is not limited to signals that change over time or that are different among different sets of pixels.

In some cases, the modulation functions for pixel sets changes frame to frame.

Depending on the particular implementation, the manner in which the modulation signals are physically implemented may vary. For example, in some cases, the pixels are CMOS imaging pixels, an electrical modulation signal causes a charge transfer (TX) transistor to transfer charge from a photodiode to a storage device (e.g., floating diffusion). In some cases: (a) each pixel has only one photodiode and more than more than one TX transistor; (b) more than one storage device (e.g., floating diffusion) is dedicated to only that pixel; and (c) each of the TX transistors in that pixel controls transfer to a different storage device.

In other cases, an electrical modulation signal causes electrodes to vary the position of mirrors in a DMD (digital micromirror device) by electrostatic attraction, thereby causing the DMD to selectively reflect light towards some pixels in the image sensor plane, and to reflect light away from some other pixels in the image sensor plane.

In other cases, an electrical modulation signal causes the properties of an SLM (spatial light modulator), such that the SLM selectively attenuates light before it reaches the image sensor plane.

Physical implementation of modulation signals is discussed in more detail below.

Effect of Modulation

In some implementations, a modulation signal controls the response of a pixel to incident light.

Figure 4:
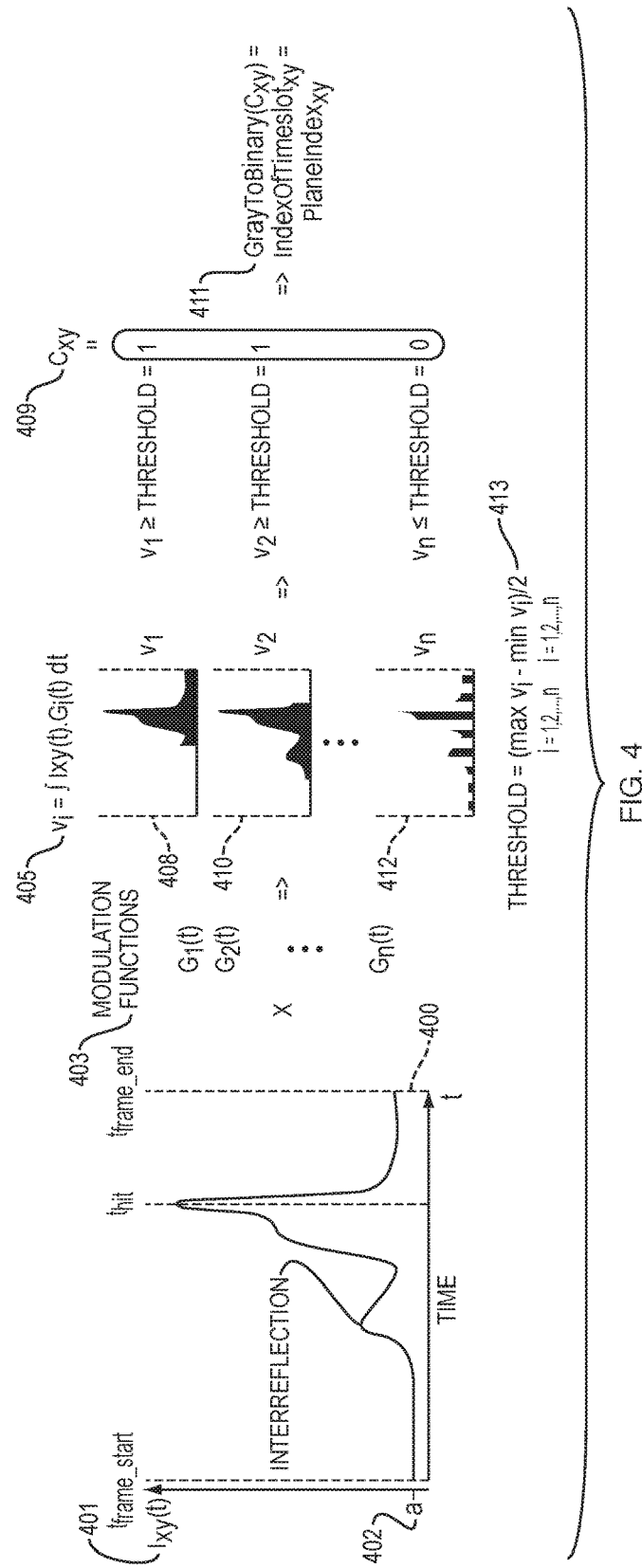
FIG. 4 is a conceptual diagram, illustrating how modulation signals control the response of pixels to incident light.

FIG. 4 is a conceptual diagram, illustrating how modulation signals control the response of pixels to incident light. In FIG. 4, plot 400 is a plot of $I_{x,y}(t)$ 401 versus time. $I_{x,y}(t)$ is the intensity of light incident on the x, $y^{th}$ superpixel (i.e., the superpixel which has coordinates x, y on the sensor plane) as a function of time. The time interval shown in plot 400 is a complete camera frame, from the start of the frame to the end of the frame. (i.e., $t_{frame\_start}$ to $t_{frame\_end}$). The intensity of incident light due to ambient background illumination has a constant amplitude of a (402). A small peak of intensity occurs at time 404 due to interreflections from the scene. The highest peak of intensity 406 occurs at time $t_{hit}$. For example, in some cases: (a) a line of laser light sweeps across the scene during each frame, and (b) the sweeping line of laser light reaches a point in the scene and reflects, such that the reflected light reaches the light sensor at time $t_{hit}$.

In FIG. 4, modulation functions $G_1(t)$ to $G_n(t)$ 403 are applied to the n pixel sets in the superpixel, one modulation function per pixel set. In the example shown in FIG. 4: (a) n=5; (b) a 5-bit gray code is employed; (c) $G_1(t)$ to $G_n(t)$ are the five signals that comprise the 5-bit gray code, one signal per bit of the code, as illustrated in FIG. 3.

In FIG. 4, $v_i(t)$ is a value for the $i^{th}$ pixel set in the superpixel. Specifically, $v_i(t)$ is equal to the integral of the product of $I_{x,y}(t)$ and $G_i(t)$ (the $i^{th}$ modulation function). This integral $v_i(t)$ is equal to the area of dark region under the curve in plots 408, 410, 412. In plots 408, 410, 412, the curve that defines the top of the dark region is equal to the product of the product of $I_{x,y}(t)$ and $G_i(t)$.

In plot 408, modulation signal $G_1(t)$ is signal 315 shown in FIG. 3. During the first half of the frame (shown in the left side of plot 408), signal 315 is closed (i.e., equal to 0), and thus the product of $I_{x,y}(t)$ and $G_1(t)$ is equal to zero, and there is no dark region under the curve. During the second half of the frame (shown in the right side of plot 408), signal 315 is open (i.e., equal to 1), and the product of $I_{x,y}(t)$ and $G_1(t)$ is equal to $I_{x,y}(t)$, and there is a dark region under the curve.

In plot 410, modulation signal $G_2(t)$ is signal 314 shown in FIG. 3. During the first and fourth quarters of the frame, signal 314 is closed (i.e., equal to 0), and thus the product of $I_{x,y}(t)$ and $G_2(t)$ is equal to zero, and there is no dark region under the curve. During the second and third quarters of the frame, signal 314 is open (i.e., equal to 1), and the product of $I_{x,y}(t)$ and $G_2(t)$ is equal to of $I_{x,y}(t)$, and there is a dark region under the curve.

In plot 412, modulation signal $G_n(t)$ is $G_5(t)$, which is signal 311 shown in FIG. 3. The frame is divided into 32 timeslots. During timeslots in which signal 311 is closed (i.e., equal to 0), the product of $I_{x,y}(t)$ and $G_5(t)$ is equal to zero, and there is no dark region under the curve. During timeslots in which signal 311 is open (i.e., equal to 1), and the product of $I_{x,y}(t)$ and $G_5(t)$ is equal to of $I_{x,y}(t)$, and there is a dark region under the curve.

In FIG. 4, the incident light function is identical for each of the pixel sets of the superpixel (that is, $I_{x,y}(t)$ is the same for all of the pixels in a superpixel, due to their close proximity). However separate modulation signals $G_1(t)$ to $G_n(t)$ are applied to the n pixel sets in the superpixel. Thus, each of the pixel sets in the superpixel receives a separate modulation signal.

A computer calculates $v_i(t)$ (the integral of the product of $I_{x,y}(t)$ and $G_i(t)$) for each pixel set in the superpixel 405. For example, a computer calculates $v_1(t)$ for the first pixel set which received modulation signal $G_1(t)$, and calculates $v_2(t)$ for the second pixel set which received modulation signal $G_2(t)$, et cetera.

A computer also calculates a threshold 413. In some cases, the threshold 413 is equal to $(\max v_i - \min v_i)/2$, where i=1, 2, . . . , n, and max $v_i$ is the maximum $v_i(t)$ for all the pixels in the superpixel, and min $v_i$ is the minumum $v_i(t)$ for all the pixels in the superpixel.

A computer then calculates code $C_{x,y}$ 409 for the x, $y^{th}$ superpixel (i.e., the superpixel which has coordinates x, y on the sensor plane). Code $C_{x,y}$ has the same number of bits as the number of pixel sets in the superpixel. A computer sets the $i^{th}$ bit of code $C_{x,y}$ to 1 if the $v_i(t)$ is greater than the threshold; otherwise the computer sets the $i^{th}$ bit of code $C_{x,y}$ to 0. In the example shown in FIG. 4, the computer: (a) sets the first bit of code $C_{x,y}$ to 1 because $v_1(t)$ is greater than the threshold; (b) sets the $n^{th}$ (in this example, the 5th) bit of code $C_{x,y}$ to 0 because $v_n(t)$ is less than the threshold.

Each permutation of code $C_{x,y}$ corresponds to a unique timeslot (time interval) within a single frame. This unique timeslot is the timeslot within which time $t_{hit}$ occurred. Thus, each permutation of code $C_{x,y}$ is effectively a timestamp that uniquely identifies a timeslot (time interval) within a single camera frame, such that incident light striking the pixel reached its maximum peak during this timeslot.

In some 3D depth-sensing implementations of this invention, a galvanometer mirror rotates, causing a plane of laser light to sweep across a scene during each camera frame. The angle of the mirror (and thus the angle of the plane of laser light) is a function of time within the frame. Thus, each permutation of code $C_{x,y}$ corresponds to a unique timeslot (time interval) within a single camera frame, which in turn corresponds to a unique angle of the plane of laser light. 411. A computer uses this angle, and other factors determined during calibration, to compute the 3D position of the scene point that reflected the laser light to the superpixel. The computer stores, for each superpixel and each angle, the 3D position of the corresponding scene point. During subsequent operation of a depth sensor, a computer calculates a permutation of code $C_{x,y}$ for each superpixel, as described above, and then uses the lookup table to compute the 3D position of the scene point that corresponds to that scene point.

In some implementations, each pixel stores charge to only one storage device, which storage device is dedicated to that pixel and does not store charge for any other pixels. (Such an implementation is sometimes herein called "single storage device implementation", and is also sometimes herein called a "partial illumination implementation", because less than all of the incident illumination is measured.)

In the example shown in FIG. 4, each pixel stores charge to only one storage device, which storage device is dedicated to that pixel and does not store charge for any other pixels. Thus, FIG. 4 illustrates a single storage device implementation.

In single storage device implementations, for each camera frame, the total photodiode charge measured by each pixel in the $i^{th}$ pixel set in a superpixel is equal to the value of $v_i(t)$ at the end of the frame (i.e., is equal to $v_i(t_{frame\_end})$). This value, in turn, depends on the modulation function $G_n(t)$ that is applied to the $i^{th}$ pixel set. Thus, the modulation function $G_i(t)$ determines the response of the pixels in the $i^{th}$ pixel set to incident light. (In most cases, each superpixel includes only one pixel from each pixel set. In those cases, the $i^{th}$ pixel set is simply the $i^{th}$ pixel.)

In some single storage implementations in which a binary code is applied to the pixels, each pixel is turned "off" and "on" many times during the duration of a single camera frame.

In many implementations, a pixel is neither "on" during an entire frame, nor "off" during an entire frame. (Putting a pixel with only a single storage device to constant "off" during an entire frame would cause the pixel not to measure any light during the frame. Putting a pixel with only a single storage bin to constant "on" for the whole frame duration would cause the pixel to measure light normally during the entire frame.)

In case of the analog modulation, the response for the light measurement ranges from completely "off" to completely "on", and this signal varies during the camera frame duration.

In cases where each pixel has multiple storage devices, the modulation signals also control the response of the pixel to incident light, as discussed below.

Modulation of Storage

In some implementations, modulation signals control storage of charge in a CMOS pixel.

Figure 5:
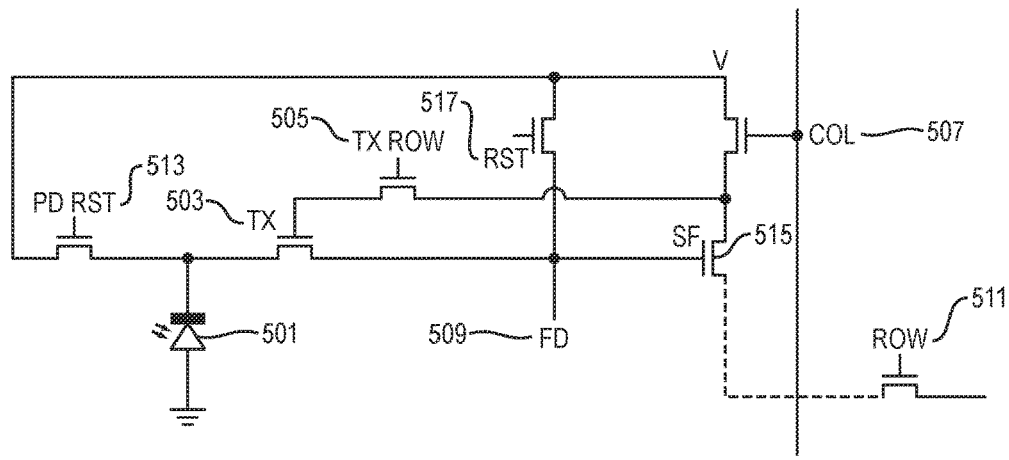
FIGS. 5, 7 and 9 are each a circuit schematic for a portion of a CMOS pixel, which pixel has one floating diffusion storage device.
Figure 7:
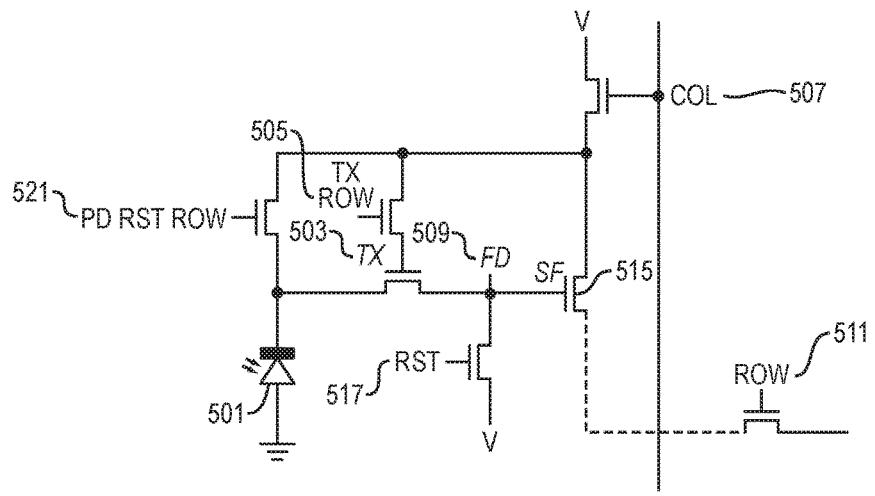
Figure 9:
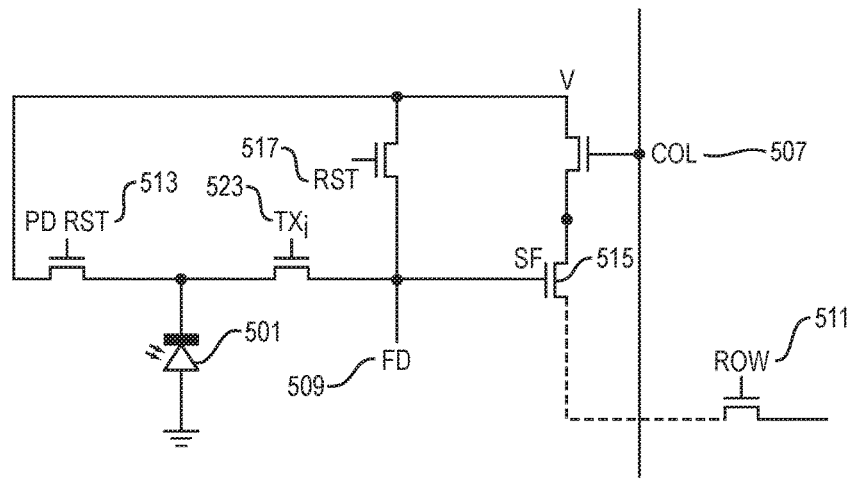

FIGS. 5, 7 and 9 show three examples of CMOS circuits, in illustrative implementations of this invention. FIGS. 5, 7 and 9 are each a circuit schematic for a portion of a CMOS pixel. The CMOS pixel has one floating diffusion storage device.

COL means column selector 507.
FD means floating diffusion 509. The floating diffusion stores electric charge.
PD RST means photodiode reset transistor 513.
ROW means row selector 511.
TX means gate transistor 503 in FIGS. 5 and 7.
TXi means gate transistor 523 in FIG. 9.
TX ROW means row selector 505 for charge transfer.
PD RST ROW means photodiode row selector 521.
RST means floating diffusion reset transistor 517. RST causes floating diffusion 509 to be reset (i.e., the charge in floating diffusion 509 to be drained) when RST is high.
SF means source follower 515. The source follower is used during the readout.
V means voltage source.

Figure 6:
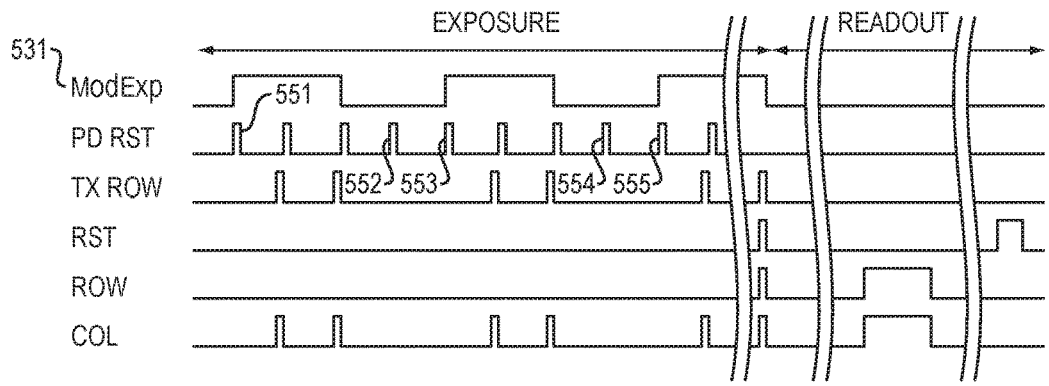
FIGS. 6, 8 and 10 are timing diagrams for FIGS. 5, 7 and 9, respectively.

In FIGS. 5 and 6, TX causes charge to be transferred from the photodiode 501 to floating diffusion 509 when voltages at COL and TX ROW are simultaneously high.

Figure 10:
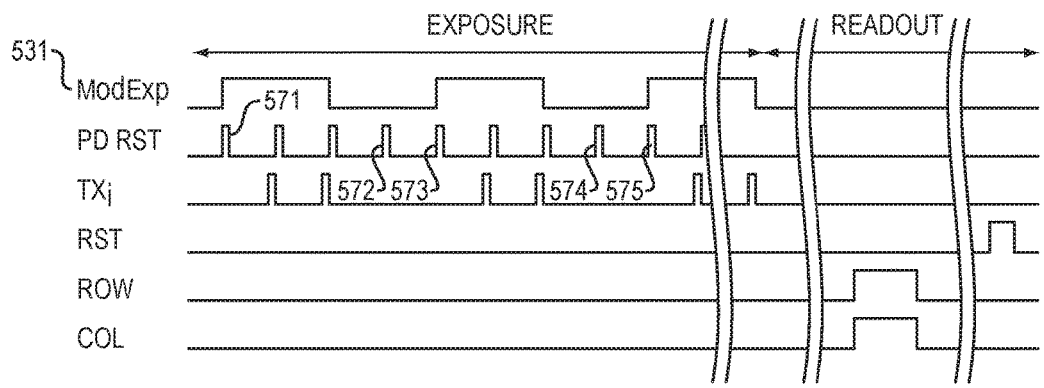

In FIGS. 9 and 10, TXi causes charge to be transferred from the photodiode 501 to the storage FD 509 when TXi is high.

Figure 8:
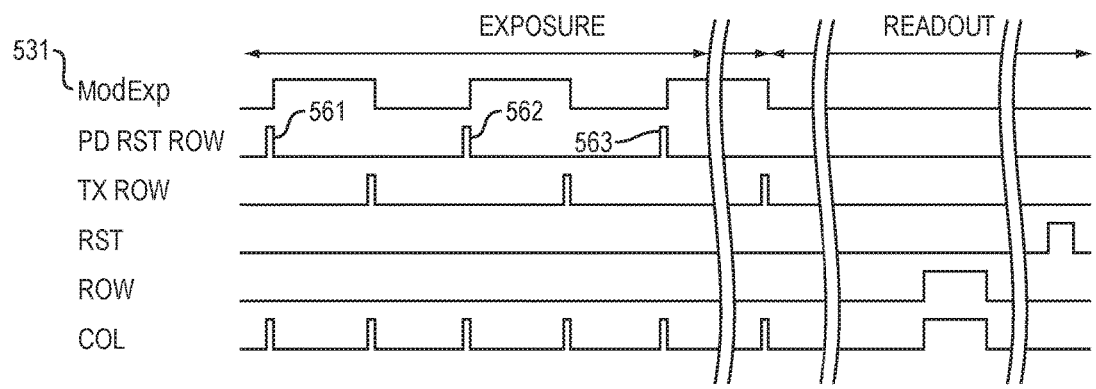

In FIGS. 7 and 8, PD RST causes photodiode 501 to be reset (that is, the charge in photodiode 501 to be drained) when COL and PD RST ROW are simultaneously high.

In FIGS. 5, 6, 9 and 10, PD RST causes photodiode 501 to be reset (that is, the charge in photodiode 501 to be drained) when PD RST is high.

In FIGS. 5, 6, 7, 8, 9 and 10, readout occurs when voltages at COL and ROW are simultaneously high.

FIGS. 6, 8 and 10 are timing diagrams for FIGS. 5, 7 and 9, respectively. In FIGS. 6, 8 and 10, the entire exposure occurs during a single camera frame, and readout and floating diffusion reset occur after the frame. In FIGS. 6, 8 and 10, ModExp 531 is a modulation signal that is one of the components of the n-bit code. Certain other signals in these Figures are derived from ModExp, as discussed below.

At multiple times during the single camera frame, the then accumulated charge in photodiode 501 is transferred to floating diffusion 509 (i.e., each time that the voltages at COL and TX ROW are simultaneously high).

Also, at multiple other times during a single camera frame, the then accumulated charge in photodiode 501 is drained without being readout or measured (e.g., when PD RST is high during 551, 552, 553, 554, 555 in FIG. 6, when both PD RST ROW and COL are high during 561, 562, 563 in FIG. 8, and when PD RST is high during 571, 572, 573, 574, 575 in FIG. 10).

Figure 11:
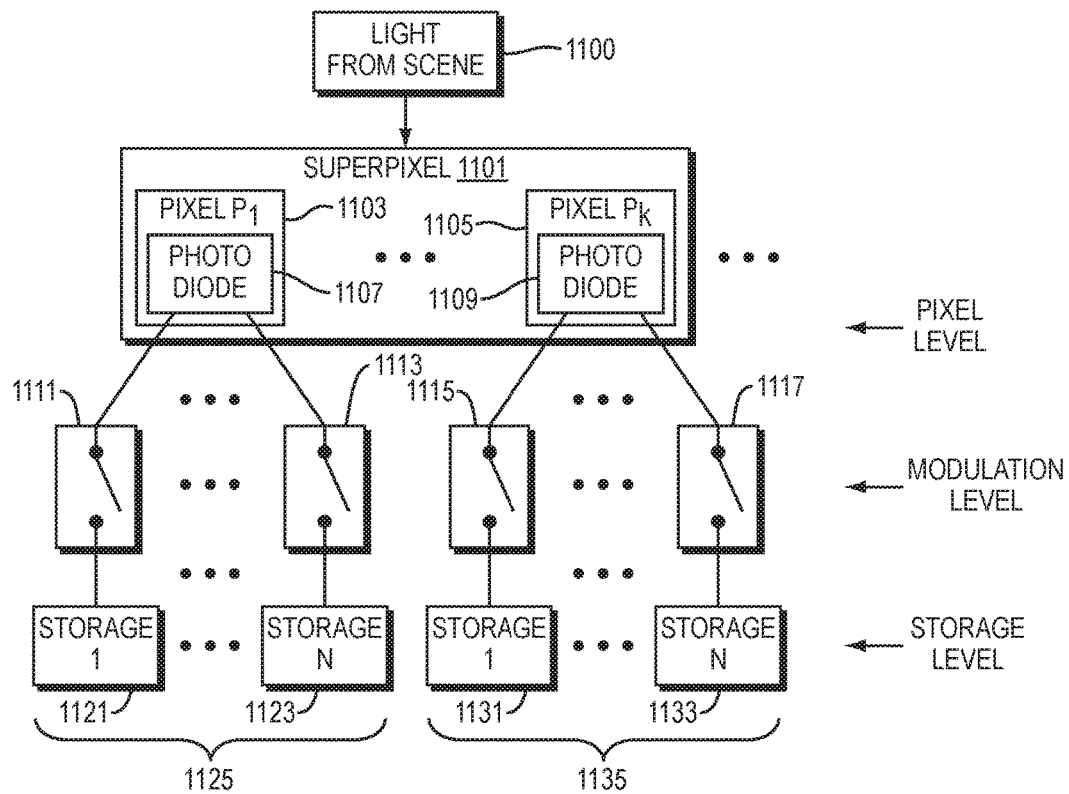
FIG. 11 is a conceptual diagram of a superpixel, in which each pixel has multiple storage devices.

FIG. 11 is a conceptual diagram of a superpixel, in which each pixel has multiple storage devices. Each pixel stores charge to multiple storage devices. Each of these multiple storage devices is dedicated to only that pixel and does not store charge for any other pixel. For example, pixel 1103 has a set of multiple storage devices 1125, and pixel 1105 has a non-overlapping set of multiple storage devices 1135.

In the example shown in FIG. 11, light from a scene 1100 strikes the photodiode (e.g., 1107, 1109) of each pixel (e.g., 1103, 1105) in a superpixel 1101. For each pixel, modulation signals cause the then accumulated photodiode charge in the pixel to be transferred to one of the storage devices for that pixel. Which storage device receives a particular transfer of charge is determined by the modulation signal. For example, for pixel 1103, a modulation signal causes transfer gate 1111 to transfer charge from photodiode 1107 to storage device 1121 at some times during a single camera frame, and causes transfer gate 1113 to transfer charge from photodiode 1107 to storage device 1123 at some other times during the camera frame. Likewise, for pixel 1105, a different modulation signal causes transfer gate 1115 to transfer charge from photodiode 1109 to storage device 1131 at some times during a single camera frame, and causes transfer gate 1117 to transfer charge from photodiode 1109 to storage device 1133 at some other times during the camera frame.

Figure 12:
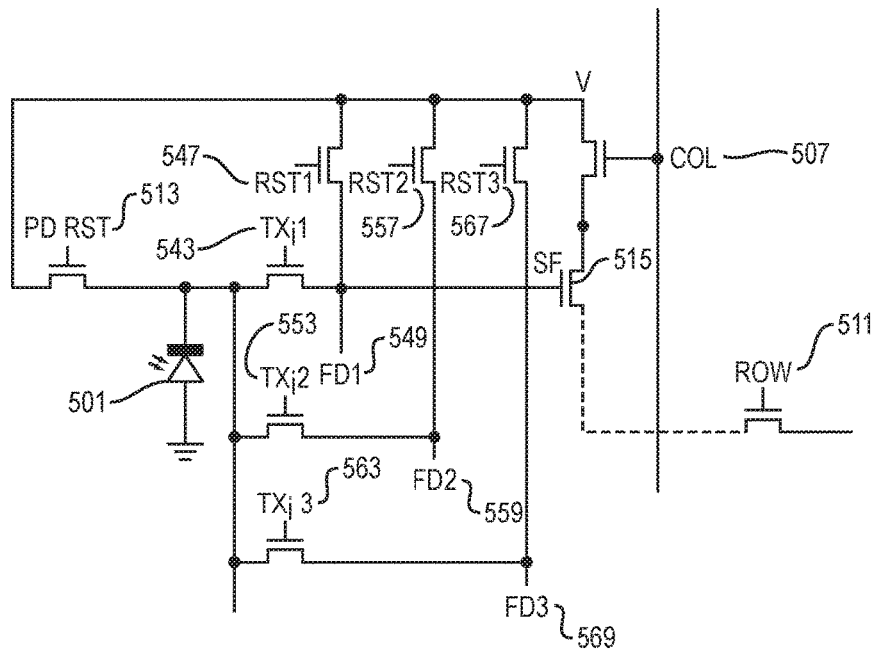
FIG. 12 a circuit schematic for a portion of a CMOS pixel that has three storage devices.

FIG. 12 is a circuit schematic for a portion of a CMOS pixel that has three floating diffusion storage devices. In FIG. 12:

COL means column selector 507.

FD1 is floating diffusion 549. FD2 is floating diffusion 559. FD3 is floating diffusion 569.

PD RST is photodiode reset transistor 513. In FIG. 12, PD RST causes photodiode 501 to be reset (that is, the charge in photodiode 501 to be drained) when PD RST is high.

ROW is row selector 511.

RST1 is floating diffusion reset transistor 547. RST2 is floating diffusion reset transistor 557. RST3 is floating diffusion reset transistor 567. In FIG. 12: (a) RST1 causes floating diffusion 509 to be reset when RST1 is high; (b) RST2 causes floating diffusion 509 to be reset when RST2 is high; and (c) RST3 causes floating diffusion 509 to be reset when RST3 is high. The reset causes charge in floating diffusion 509 to be drained. SF is source follower 515.

TXi1 is transfer gate 543. TXi2 is transfer gate 553. TXi3 is transfer gate 563. In FIG. 12: (a) TXi1 causes charge to be transferred from the photodiode 501 to the storage FD1 549 when TXi1 is high; (b) TXi2 causes charge to be transferred from the photodiode 501 to the storage FD2 559 when TXi2 is high; and (c) TXi3 causes charge to be transferred from the photodiode 501 to the storage FD3 569 when TXi3 is high.

In some implementations, modulation signals control storage of charge for CCD pixels.

Figure 13:
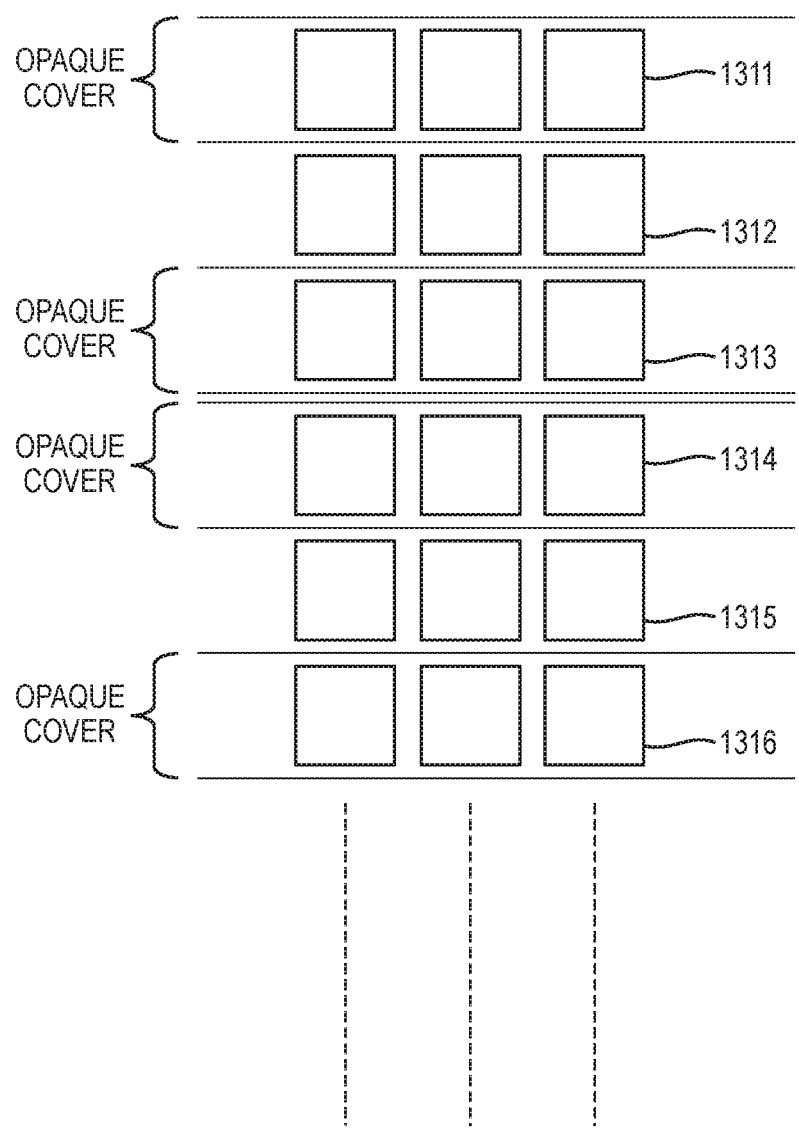
FIG. 13 is a conceptual diagram of CCD pixels, in which each pixel has two storage devices.

FIG. 13 is a conceptual diagram of CCD pixels, in which each pixel has two storage devices. During a single camera frame, for each pixel in the array, charge is transferred from the photodiode of the pixel at some times to one of the storage devices for the pixel, and at other times to the other storage device for the pixel. For example, during a single camera frame: (a) a modulation signal causes the then accumulated photodiode charge in pixel 1312 to be transferred to a capacitive bin at position 1311 at some times, and to be transferred to a capacitive bin at position 1303 at some other times; and (b) a separate modulation signal causes the then accumulated photodiode charge in pixel 1315 to be transferred to a capacitive bin at position 1314 at some times, and to be transferred to a capacitive bin at position 1316 at some other time.

After the end of the frame, the charges are shifted down each column of the array in a conventional CCD manner. For example, charge is read out from the capacitive bin at position 1316 at the edge of the array, then the charge in the capacitive bin at position 1315 is shifted to the capacitive bin at position 1316, then the charge in the capacitive bin at position 1314 is shifted to the capacitive bin at position 1315, then the charge in the capacitive bin at position 1313 is shifted to the capacitive bin at position 1314, then the charge in the capacitive bin at position 1312 is shifted to the capacitive bin at position 1313, then the charge in the capacitive bin at position 1311 is shifted to the capacitive bin at position 1312. Then the charge is read out again from the capacitive bin at position 1316 at the edge of the array, etc.

Figure 14:
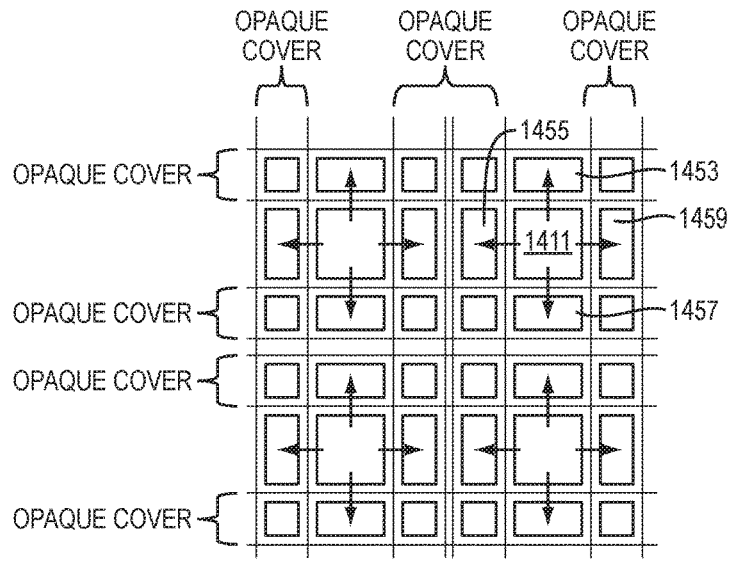
FIG. 14 is a conceptual diagram of CCD pixels, in which each pixel has four storage devices.

FIG. 14 is a conceptual diagram of CCD pixels, in which each pixel has four storage devices. During a single camera frame, for each pixel in the array, charge is transferred from the photodiode of the pixel at some times to the first storage device for the pixel, at other times to the second storage device for the pixel, at yet other times to the third storage device for the pixel, and at yet other times to the fourth storage device for the pixel. For example, during a single camera frame, a modulation signal causes the then accumulated photodiode charge in pixel 1411: (a) to be transferred to a capacitive bin at position 1453 at some times; (b) to be transferred to a capacitive bin at position 1455 at some other times; (c) to be transferred to a capacitive bin at position 1457 at some times; and (d) to be transferred to a capacitive bin at position 1459 at some other times. After the end of the frame, the charges are shifted down each column of the array in a conventional CCD manner.

In a pixel with two storages, one storage is by convention considered to be the primary storage. The "on" state of modulation of such a pixel means that the charge is transferred to the primary storage. The "off" state of the modulation of such a pixel means that the charge is transferred to the secondary storage. The image recovered from the primary storages is the "positive" image, accumulated during the "on" phases. The image recovered from the secondary storages is the "negative" image, accumulated during the "off" phases. Summing these two together gives the total image, i.e. an image which would be captured by an ordinary (unmodulated) camera.

As used herein, a "multiple storage implementation" or "total charge implementation" means an implementation in which each pixel has multiple storage devices that receive charge only from that pixel during the exposure time of a frame. Such an implementation is sometimes called a "total charge implementation" to emphasize that charge is not, by design, drained at some times during the frame without being measured.

1Multiple storage implementations are advantageous for at least two reasons.

First, in some multiple storage implementations, a computer calculates a dynamic threshold depending on the total illumination for a particular pixel. For example, in some cases, instead of having a fixed threshold for deciding whether a pixel's value represents a logical 0 or logical 1 in code $C_{x,y}$, (see discussion of FIG. 4), a computer compares the pixel's value to a threshold computed, for example, as 50% of the total value.

Second, in some multiple storage implementations, a computer calculates a total image for a single frame, by summing, for each pixel, the sum of the charges captured by the multiple storage devices for that pixel during that frame.

In most implementations, the modulation signals that comprise a code (such as signals 311-315 in FIG. 3) do not directly control timing within the pixel. Instead, electronic circuitry in the image sensor, or in the camera circuitry, or in the control unit converts each modulation signal to one or more intermediate signals, which directly or indirectly control timing within each pixel or pixel set, such as the timing of (i) photodiode reset, (ii) floating diffusion reset, (iii) readout, (iv) transfer of charge from photodiode to floating diffusion or to a capacitive bin; or (v) CCD shifts, in the case of a CCD. For example, in some implementations using CMOS pixels, the intermediate signals comprise high or low (binary values) of voltage applied to TX, TXi, TXi1, TXi2, TXi3, RST, RST1, RST2, RST3, TD ROW, PD RST, or PD RST ROW. In some cases, changes in an intermediate signal are triggered by the rising edge, falling edge or both of the modulation signal. In some cases, changes in an intermediate signal occur at a specified delay after the rising edge, falling edge or both of the modulation signal. In some cases, changes in an intermediate signal are the logical complement of the modulation signal (i.e., 0 if the modulation signal is 1, or 1 if the modulation signal is 0). In some cases, an intermediate signal that triggers transfer of charge from a photodiode to floating diffusion (i) becomes high when the modulation signal goes from high to low, stays there for a small amount of time necessary to transfer the charge, and goes low; and (ii) ignores the low-to-high transition of modulation signal.

Delayed signals are desirable in some cases when it is known that different elements of the pixel circuit have different latencies, or require different times to transfer the charge.

In some implementations, constraints imposed by the hardware implementation require that the modulation signals satisfy one or more logical conditions. For example, in some multiple storage implementations, the following logical condition must be satisfied: at any one time, at most one modulation signal per pixel is in a state that triggers transfer of charge. This is because if more than one transfer gate is open, the charge from photodiode splits between the storages, which is undesirable. In some other implementations, a logical condition is that storage modulation signals add up to 1.

This invention is not limited to binary coding. As used herein, "n-ary code" means code in which the digits are expressed in base n, where n is an integer greater than 2. For example, 3-ary code is written in base 3, and is sometimes called ternary code.

In some embodiments of this invention, ternary code is used with pixels that each have two storage devices. In that case, three values of the ternary code ("A","B","C") signal causes the charge to be transferred into storage "A", into storage "B", or trashed, respectively. In some cases: (a) each pixel has three storage devices; (b) ternary code is used; (c) instead of trashing the light in the "C" case, the charge is transferred into the third storage ("C"); and (d) A+B+C are summed to get the total amount of light.

In some implementations that employ n-ary code, each pixel has n-1 or n storages. With n-1 storage devices per pixel, the n-ary code is recoverable. With n storage devices per pixel, the n-ary code and total amount of light are recoverable.

In some implementations that employ n-ary code and that use n storage devices per pixel, the values 0, 1, . . . , n-1 of the n-ary code cause the charge to be transferred into the 1st, 2nd, . . . , nth storage, respectively. The total illumination image is obtained by summing all values of the 1st, 2nd, . . . , nth storage.

In some implementations that employ n-ary code and that use n-1 storage devices per pixel, the value 0 causes the photodiode charge to be drained, in some cases without being saved for later readout. The values 1, . . . , n-1 of the n-ary code cause the charge to be transferred into the 1st, 2nd, . . . , $(n-1)^{th}$ storage, respectively.

Figure 15:
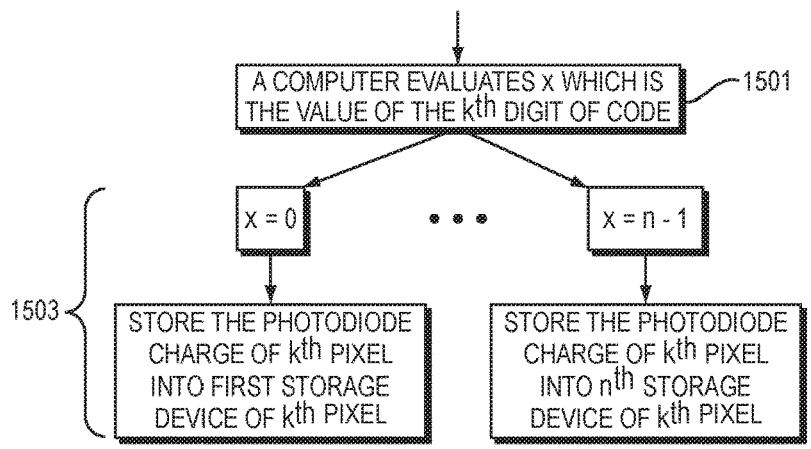
FIG. 15 is a flowchart for modulation of storage using an n-ary code, such that all of the photodiode charge is stored for later readout.

In some implementations, modulation of pixel storage is controlled by an n-ary code, such that all of the photodiode charge of each pixel is stored for later readout. FIG. 15 shows an example of this approach. In FIG. 15, each pixel has n storage devices, and storage modulation for the $k^{th}$ pixel in a superpixel includes the following steps: A computer evaluates x, which is the value of the $k^{th}$ digit of an n-ary code of length m (Step 1501), and causes the photodiode charge in the $k^{th}$ pixel to be transferred to the $(x+1)^{th}$ storage device for the $k^{th}$ pixel. (Step 1503). For example, if x equals 0, then the pixel's photodiode charge is transferred to the first storage device for the pixel. For example, if x equals n-1, then the pixel's photodiode charge is transferred to the $n^{th}$ storage device for the pixel. If a superpixel has more than one pixel that is a member of the $k^{th}$ pixel set and the method shown in FIG. 15 is used, then storage modulation for each of these pixels is done simultaneously, in the manner shown in FIG. 15.

Figure 16:
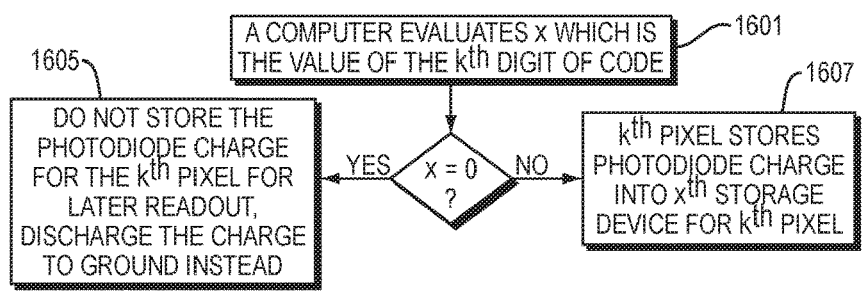
FIG. 16 is a flowchart for modulation of storage using an n-ary code, such that only a portion of the photodiode charge is stored for later readout.

In some implementations, modulation of pixel storage is controlled by an n-ary code, such that only a portion of the photodiode charge of each pixel is stored for later readout. FIG. 16 shows an example of this approach. In FIG. 16, each pixel has multiple (e.g., n-1) storage devices, and storage modulation for the $k^{th}$ pixel in a superpixel includes the following steps: A computer evaluates x, which is the value of the $k^{th}$ digit of a modulation code. (Step 1601) If x equals 0, then the photodiode charge in the $k^{th}$ pixel is drained, and is not saved for later readout. (Step 1603) If x is not equal to 0, then the photodiode charge in the $k^{th}$ pixel is transferred to the $(x+1)^{th}$ storage device for the $k^{th}$ pixel. (Step 1605).

If a superpixel has more than one pixel that is a member of the $k^{th}$ pixel set and the method shown in FIG. 16 is used, then storage modulation for each of these pixels is done simultaneously, in the manner shown in FIG. 16.

Figure 17:
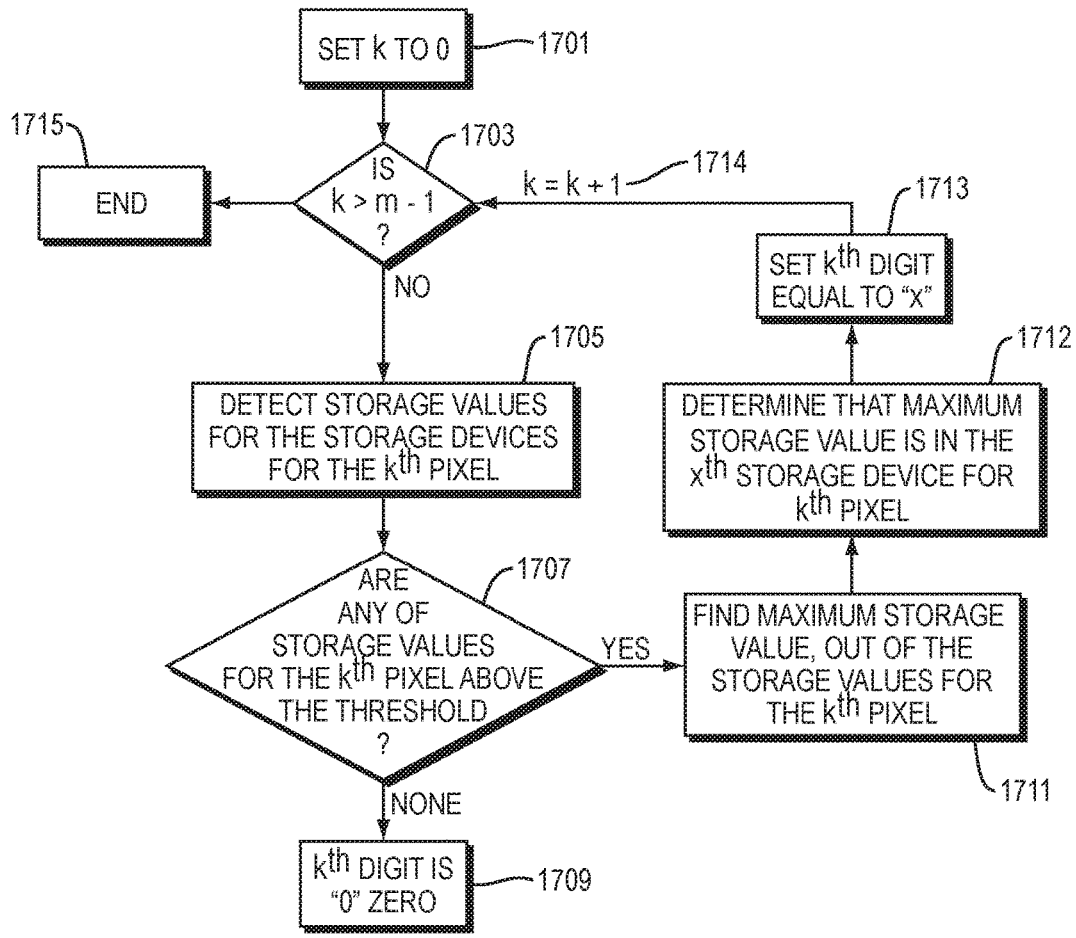
FIG. 17 is a flowchart for decoding an n-ary code, after storage modulation in which only a portion of the photodiode charge is stored for later readout.

FIG. 17 is a flowchart for decoding n-ary code, after storage modulation in which only a portion of the photodiode charge is stored for later readout. In FIG. 17, the code that is being decoded has m digits, and each pixel has multiple (e.g., n-1) storage devices. Decoding for each superpixel includes the following steps: A computer sets k equal to zero (Step 1701). A computer evaluates if k is greater than m-1. (Step 1703) If yes, then decoding stops for that superpixel, and the computer repeats the decoding for each of the superpixels, until all of the superpixels are decoded. (Step 1715) If no, then a computer detects the storage value (i.e., level of charge stored in a storage device) for each of the multiple storage devices of the $k^{th}$ pixel. (Step 1705) A computer determines if any of these storage values exceed a threshold. (Step 1707). If none of these storage values exceed the threshold, then a computer sets the $k^{th}$ digit of the code to zero. (Step 1709) If at least one of these storage values exceeds the threshold, then a computer: (a) determines the maximum storage value, out of these storage values (Step 1711), (b) determines that the maximum storage value is stored in the $x^{th}$ storage device for the $k^{th}$ pixel (Step 1712), (c) sets the $k^{th}$ digit of the code to x (Step 1713) and (d) sets k equal to k+1 (Step 1714)

If a superpixel has more than one pixel that is a member of the $k^{th}$ pixel set, then the method in FIG. 17 is modified for that superpixel so that: (a) in Step 1705, a computer determines storage values for each of the storage devices for each of the pixels in the superpixel that are members of the $k^{th}$ pixel set; and (b) in Step 1707, a computer determines that the maximum storage value, out of these storage values, is stored in the $x^{th}$ storage device of one of these pixels.

Figure 18:
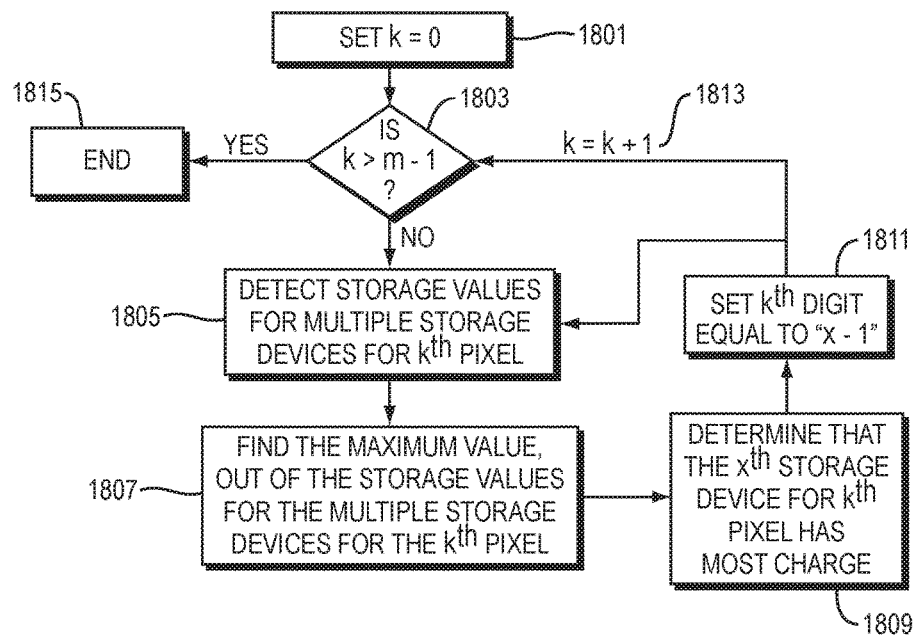
FIG. 18 is a flowchart for decoding an n-ary code, after storage modulation in which all of the photodiode charge is stored for later readout.

FIG. 18 is a flowchart for decoding n-ary code, after storage modulation in which all of the photodiode charge is stored for later readout. In FIG. 18, the code that is being decoded has m digits, and each pixel has n storage devices. Decoding for each superpixel includes the following steps: A computer sets k equal to zero (Step 1801). A computer evaluates if k is greater than m-1. (Step 1803) If yes, then decoding stops for that superpixel, and the computer repeats the decoding for each of the superpixels, until all of the superpixels are decoded. (Step 1815) If no, then a computer detects the storage value (i.e., level of charge stored in a storage device) for each of the multiple storage devices of the $k^{th}$ pixel. (Step 1805) A computer: (a) determines the maximum storage value, out of these storage values (Step 1807), (b) determines that the maximum storage value is stored in the $x^{th}$ storage device for the $k^{th}$ pixel (Step 1809), (c) sets the $k^{th}$ digit of the code to x−1 (Step 1811), and sets k equal to k+1 (Step 1813).

If a superpixel has more than one pixel that is a member of the $k^{th}$ pixel set, then the method in FIG. 17 is modified for that superpixel so that: (a) in Step 1705, a computer determines storage values for each of the storage devices for each of the pixels in the superpixel that are members of the $k^{th}$ pixel set; and (b) in Step 1707, a computer determines that the maximum storage value, out of these storage values, is stored in the $x^{th}$ storage device of one of these pixels.

Analog Modulation

Figure 19:
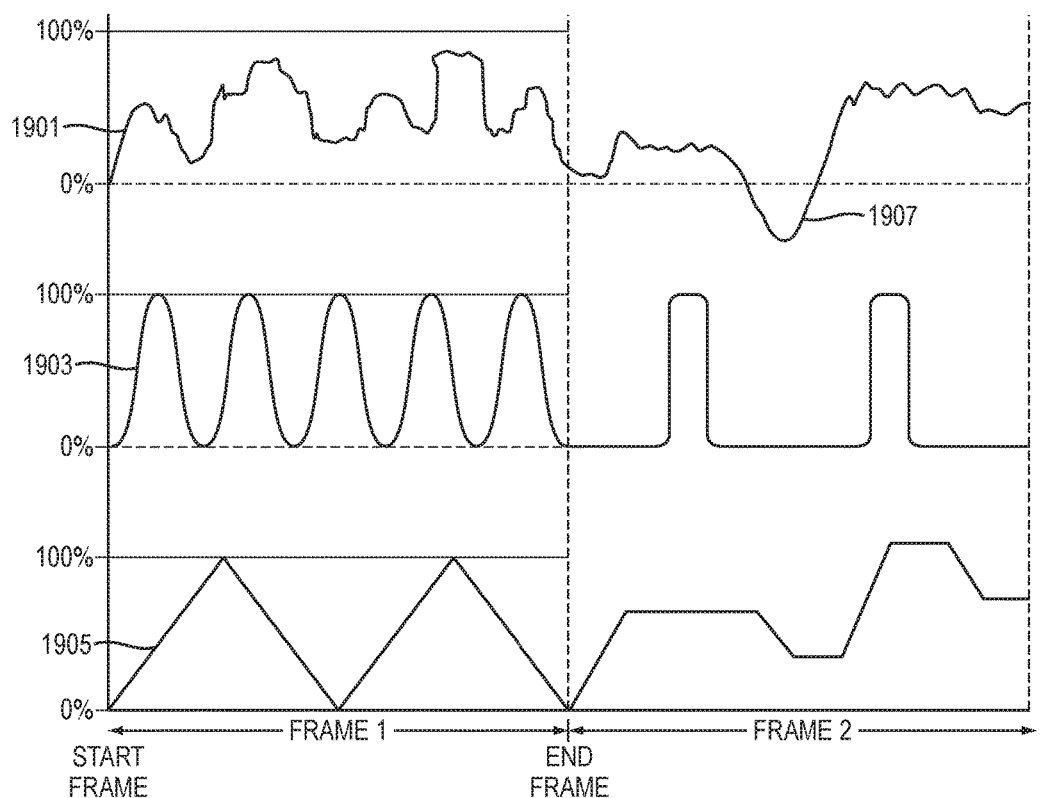
FIG. 19 is diagram that illustrates three examples of analog modulation signals.

In some cases, the modulation signals are analog signals. In some cases, modulations signals (either digital or analog) undergo at least one change between camera frames. FIG. 19 is diagram that illustrates three examples of analog modulation signals that change from frame to frame. Signal 1901 is an aperiodic signal in both frame 1 and frame 2. Signal 1903 is a periodic signal that is sinusoidal in frame 1 and non-sinusoidal in frame 2. In frame 1, signal 1905 is a periodic triangle wave that is shifted upward so that the minimum value is zero. In frame 2, signal 1905 is aperiodic.

In some cases, an analog modulation signal is negative at times, such as signal 1901 at time 1907 in FIG. 19. In some cases, a "negative" value of a modulation signal is implemented as follows: the storage is pre-charged by a fixed amount of charge. For a negative portion of the modulation signal, a transfer gate is opened to release an amount of charge from the storage device proportional to the absolute value of the modulation signal. During the readout phase, a computer treats the pre-charged amount as the zero value, treats an amount of charge below this value as a negative readout; and treats an amount of charge larger than the pre-charge amount as a positive readout.

Light Modulation

In some implementations, modulation signals control the intensity of light incident on the photodiode of a pixel.

Figure 20:
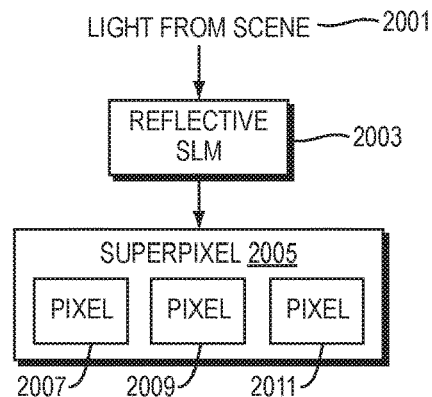
FIG. 20 is a conceptual diagram illustrating the use of a reflective SLM for modulating the intensity of light incident on photodiodes of pixels in a superpixel.

FIG. 20 is a conceptual diagram illustrating the use of a reflective SLM (spatial light modulator) for modulating the intensity of light incident on the photodiodes of pixels in a superpixel. In the example shown in FIG. 20, light from a scene 2001 strikes reflective SLM 2003 and is selectively reflected, such that which of the pixels, if any, of a superpixel 2005 are illuminated by reflected light from SLM 2003 at any given time during a camera frame is controllable. For example, which pixels, out of 2007, 2009 and 2011, are illuminated by reflected light from SLM 2003 varies during a single camera frame. For example, in some cases, during a single camera frame: (a) at some times pixel 2007 is illuminated by reflected light from SLM 2003 but pixels 2009 and 2011 are not; and (b) at other times pixels 2007 and 2009 are illuminated by reflected light from SLM 2003 but pixel 2011 is not. In some cases, the reflective SLM comprises a DMD (digital micromirror device) or a reflective LCOS (liquid crystal on silicon) device.

Figure 21:
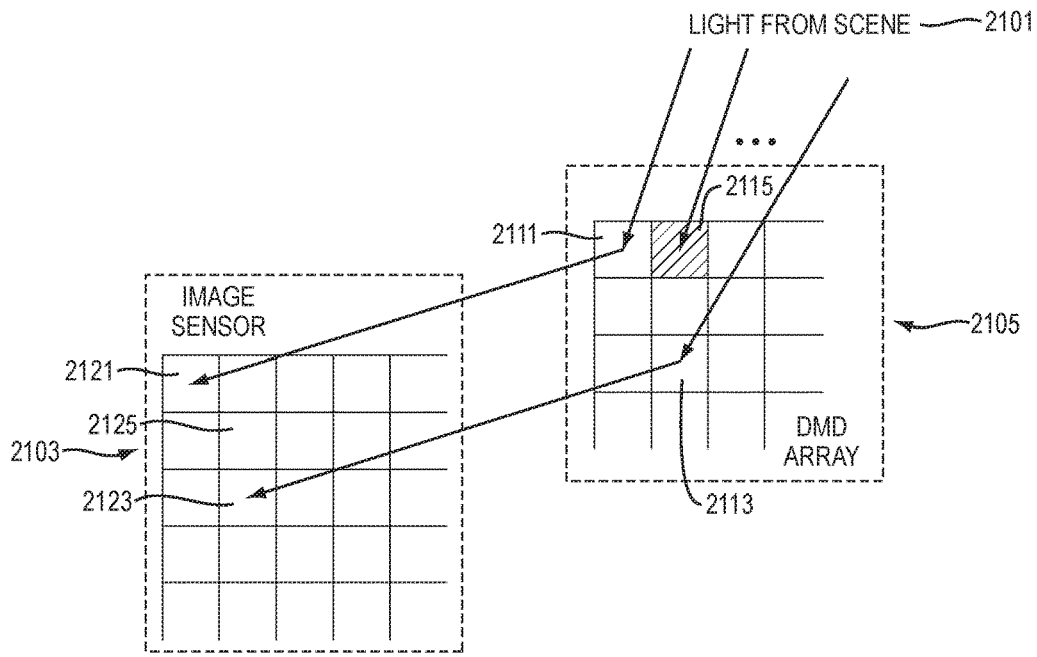
FIG. 21 is a ray diagram that shows a DMD selectively reflecting light from a scene at a particular time, such that reflected light is steered toward some, but not all, of the pixels in a superpixel of an image sensor.

FIG. 21 is a ray diagram that shows a DMD selectively reflecting light from a scene at a particular time, such that reflected light is steered toward some, but not all, of the pixels in a superpixel of an image sensor. In the example shown in FIG. 21, the pixels in the image sensor and pixels of the DMD array are optically aligned, such that each pixel of the DMD corresponds to a pixel of the image sensor. The pixels in the DMD array are switched between two states, "A" and "B". When the mirror for a DMD pixel is in the "A" state, the mirror reflects the light to the corresponding pixel in the image sensor. When the mirror for a DMD pixel is in the "B" state, the light is reflected in another direction. By switching a DMD pixel between these two states, the light incident on the corresponding pixel of the image sensor is modulated, and thus the response of the pixel to the light coming from the scene is modulated.

In the example shown in FIG. 21, pixels in a DMD array 2105 are optically aligned with pixels in image sensor 2103. For example, DMD pixels 2111, 2113 and 2115 correspond to image sensor pixels 2121, 2123 and 2125, respectively. Light from a scene 2101 is striking DMD pixels 2111, 2113 and 2115. DMD pixels 2111 and 2113 are in state "A", such that light reflects from these pixels to image sensors 2123 and 2123, respectively. DMD pixel 2115 is in state "B", such that light reflects from this DMD pixel in a direction away from image sensor 2125, thus causing the reflected light not to reach image sensor pixel 2125. Image sensor pixels 2111, 2113 and 2115 are all in the same superpixel.

Figure 22:
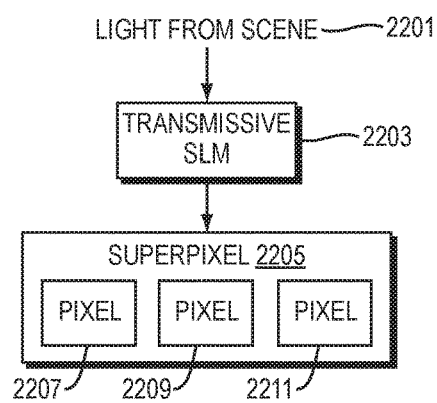
FIG. 22 is a conceptual diagram illustrating the use of a transmissive SLM for modulating the intensity of light incident on photodiodes of pixels in a superpixel.

FIG. 22 is a conceptual diagram illustrating the use of a transmissive SLM for modulating light incident on photodiodes of pixels in a superpixel.

In the example shown in FIG. 22, light from a scene 2201 passes through transmissive SLM 2203, and is selectively attenuated, such that which of the pixels, if any, of a superpixel 2005 are illuminated by light passing through the SLM at any given time during a camera frame is controllable. For example, which pixels, out of 2207, 2209 and 2211, are illuminated by light passing through SLM 2203 varies during a single camera frame. For example, in some cases, during a single camera frame: (a) at some times pixel 2207 is illuminated by light passing through SLM 2203 but pixels 2209 and 2211 are not; and (b) at other times pixels 2207 and 2209 are illuminated by light passing through SLM 2203 but pixel 2011 is not. In some cases, the transmissive SLM comprises an LCD (liquid crystal display) or an array of ferromagnetic shutters.

Figure 23:
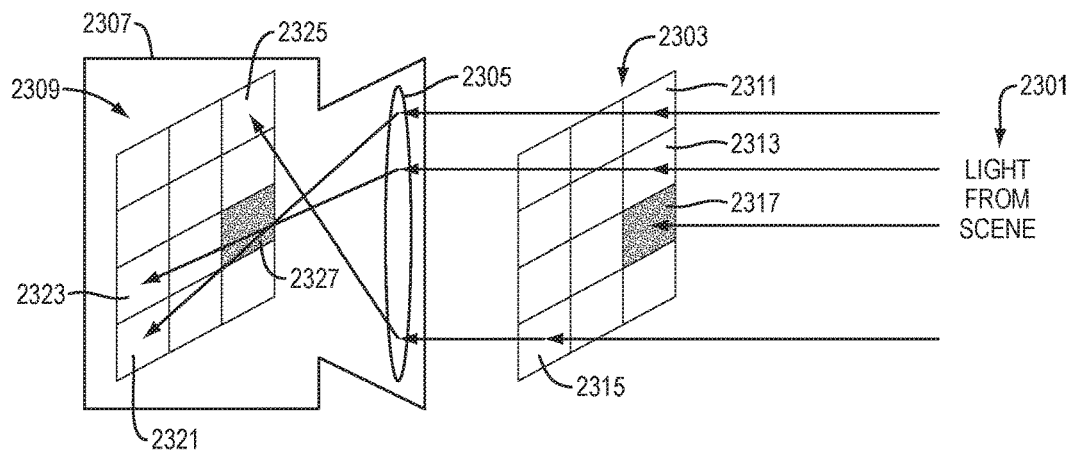
FIG. 23 is a ray diagram showing an LCD selectively attenuating light from a scene, such that light reaches some, but not all, of the pixels of a superpixel in an image sensor.

FIG. 23 is a ray diagram showing an LCD selectively attenuating light from a scene at a particular time, such that light passing through the LCD reaches some, but not all, of the pixels of a superpixel in an image sensor. In the example shown in FIG. 21, the pixels in the image sensor and pixels of the LCD are optically aligned, such that each pixel of the LCD corresponds to a pixel of the image sensor. The pixels in the LCD array are switched between two states, "on" and "off". When an LCD pixel is in the "on" state, light from the scene passes through the LCD pixel and travels to the corresponding pixel in the image sensor. When an LCD pixel is in the "off" state, the LCD pixel is opaque and blocks light. By switching an LCD pixel between these two states, the light incident on the corresponding pixel of the image sensor is modulated, and thus the response of the pixel to the light coming from the scene is modulated.

In the example shown in FIG. 23, pixels in LCD 2303 are optically aligned with pixels in image sensor 2309. For example, LCD pixels 2311, 2313, 2315 and 2317 correspond to image sensor pixels 2321, 2323, 2325 and 2327, respectively. Light from a scene 2301 is striking LCD pixels 2311, 2313, 2315 and 2317. LCD pixels 2311, 2313, 2315 are in the "on" state, such that light passes through these LCD pixels and travels to image sensors 2321, 2323 and 2325, respectively. LCD pixel 2317 is in the "off" state, such that LCD pixel 2317 is opaque, thus preventing light from passing through LCD pixel 2317 and traveling to image sensor pixel 2327. Image sensor pixels 2321, 2323, 2325 and 2327 are all in the same superpixel.

In FIG. 23, a camera 2307 includes a lens 2305 and the image sensor 2309. The lens bends light from the LCD 2303. Similarly, in some cases: (a) a lens is interposed between a reflective SLM (such as a DMD or reflective LCOS) and the image sensor, and (b) the lens bends light rays that travel from the reflective SLM through the lens to the reflective SLM.

Figure 24A:
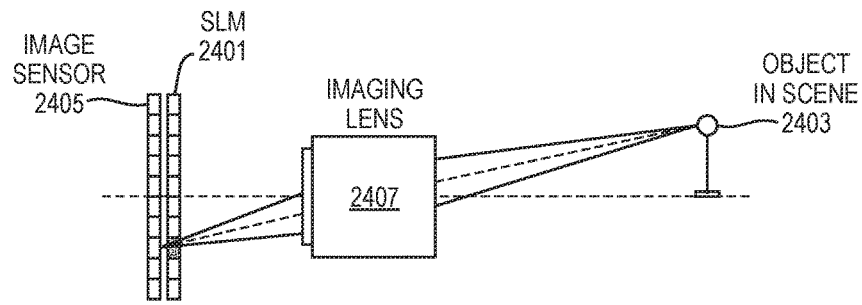
FIGS. 24A, 24B and 24C are each a diagram of an optical system that includes a transmissive SLM.
Figure 24B:
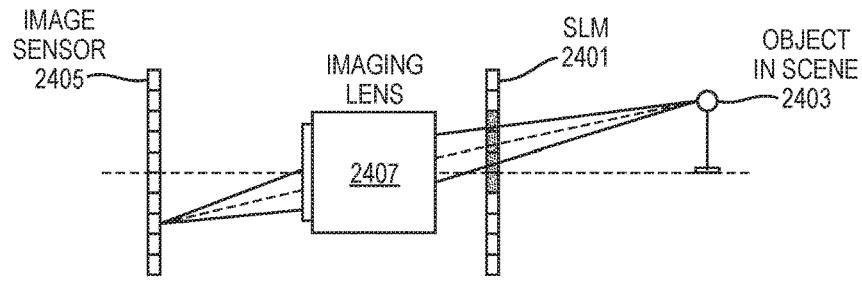
Figure 24C:
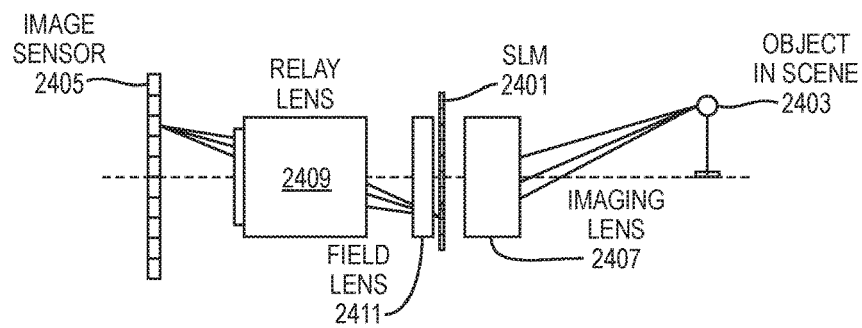

FIGS. 24A, 24B and 24C are each a diagram of an optical system that includes a transmissive SLM. In each of FIGS. 24A, 24B and 24C, the SLM selectively attenuates light, such that at different times during a single camera frame, the SLM blocks light from reaching different sets of the pixels in the image sensor.

In FIG. 24A, a transmissive SLM 2401 is adjacent to the image sensor 2405. In FIG. 24A, light travels from an object in the scene 2403 through an imaging lens 2407, then through the SLM 2401, and then to the image sensor 2405.

In FIG. 24B, an imaging lens 2407 is positioned between the transmissive SLM 2401 and the image sensor 2405. In FIG. 24B, light travels from an object in the scene 2403, then through the SLM 2401, then through an imaging lens 2407, and then to the image sensor 2405.

In FIG. 24C, a field lens and relay lens are positioned between the transmissive SLM 2401 and the image sensor 2405. In FIG. 24C, light travels from an object in the scene 2403, then through an imaging lens 2407, then through the SLM 2401, then through a field lens 2411, then through a relay lens 2409, and then to the image sensor 2405.

In some implementations in which an SLM is used, a computer separately controls each pixel in the SLM, and thus the computer controls the size and shape of a superpixel in the image sensor. For example, in some cases, a computer sends signals to a reflective or transmissive SLM, such that 9 pixels comprise a 3×3 pixel superpixel, or such that 12 pixels comprise a 4×3 pixel superpixel, or such that 16 pixels comprise a 4×4 pixel superpixel.

In some cases, a reflective or transmissive SLM does not have the same size or shape as the image sensor. In those cases: (a) some pixels in the image sensor do not correspond to pixels in the SLM; and (b) light modulation is applied only to pixels in the image sensor that are aligned with pixels in the SLM.

In some cases: (a) the pixels in the SLM and camera are not precisely aligned; and (b) pixels for which the imprecision exceeds a given threshold are ignored. The value at that position is interpolated or returned as "unknown".

In many cases where a reflective or transmissive SLM is used, each pixel has only storage device that is dedicated to that pixel and does not receive charge from any other pixel during the exposure time of a camera frame.

Comparison to Time-Multiplexed Structured Illumination

It is interesting to compare this invention to conventional time-multiplexed structured illumination.

Figure 25:
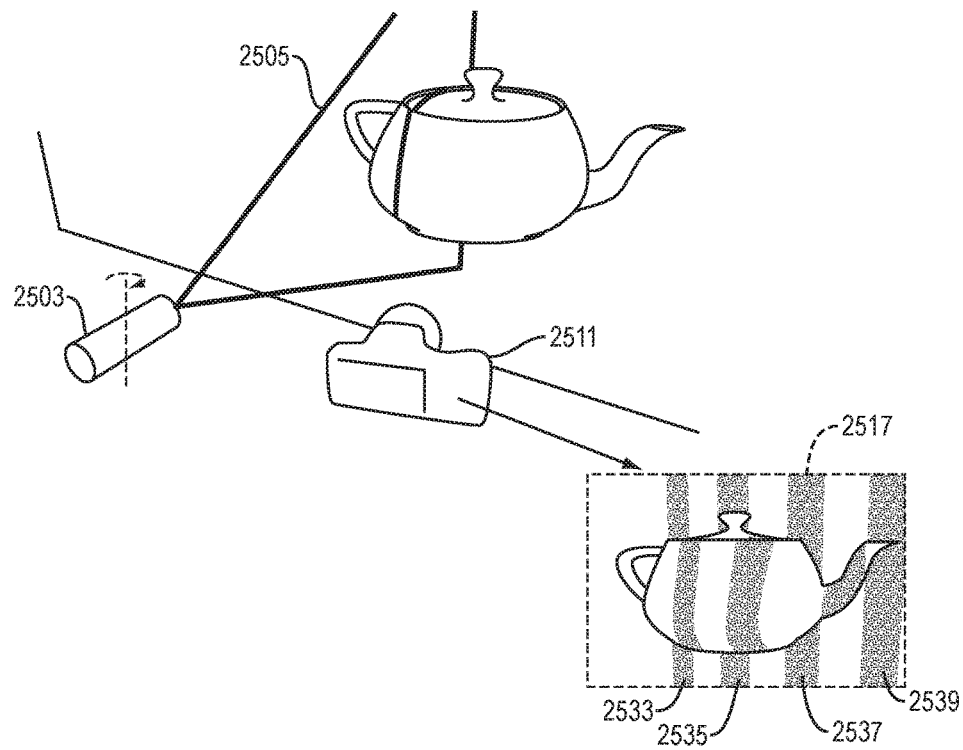
FIG. 25 is a conceptual diagram that shows an example of prior art, time-multiplexed structured illumination.

FIG. 25 is a conceptual diagram that shows a prior art example of conventional time-multiplexed structured illumination. In FIG. 25, the camera 2511 sensitivity is not modulated. The laser 2503 and a Powell lens (not shown) project a plane of laser light 2505. The line of laser light 2505 sweeps across the scene during each camera frame. The intensity of the laser light is modulated by a binary modulation pattern, causing the laser light to turn on and off repeatedly during a single sweep. The camera captures a single frame during the sweep of the laser light across the scene. In the image 2517 captured during this frame, the dark stripes 2533, 2535, 2537, 2539 correspond to the times during the sweep at which the laser light is turned off.

In conventional time-multiplexed structured illumination (such as that shown in FIG. 25): (a) n separate modulation signals that comprise the n-bit code are applied during n separate frames of the camera, one modulation signal per frame, to modify illumination of the scene; and (b) the sensitivity of the camera to light is not modulated.

In contrast, in illustrative implementations of this invention: (a) all n separate modulation signals that comprise an n-bit code are applied during a single frame of a camera, to separately modify the response of n pixels in each superpixel to incident light; and (b) the intensity of the light source is kept constant during the sweep of the plane of light.

In illustrative implementations, this invention captures in a single camera frame the same type of data as is captured during multiple camera frames with time-multiplexed structured illumination. Capturing all of the data in a single frame (in illustrative implementations of the present invention) rather than in multiple frames (as in conventional time-multiplexed structured illumination) has the desirable effect of reducing distortion and artifacts in 3D sensing that are caused by motion blur.

3D Scanning

In illustrative implementations, this invention is used for 3D scanning—i.e., for detection of the 3D position of points in a scene.

In illustrative implementations, a system comprises at least one camera with a modulatable image sensor, an optional ordinary camera, a control unit, a processing unit, and at least one illumination unit. Modulation of pixels of a superpixel during a camera frame creates a specific code in the pixels of the superpixel In this system, a light source emits light, such that the position of the intersection of the light and the scene changes over time.

In illustrative implementations, the spatio-temporal characteristics of the light source are such that the spatial position of a point of the scene captured by a superpixel is computationally recoverable from the camera calibration, the relative position of the light source and the camera, and the charge values recorded by the pixels of the superpixel during a single frame of a camera.

In illustrative implementations, the spatiotemporal characteristics of the light source are such that: (a) for a given point in the scene, the time function of the intensity of direct illumination from the light source in a point of the scene exhibits only one peak; and (b) the intersection of (1) the set of the points illuminated at time t and (2) the pixel ray of the superpixel has only one solution, given constraints consisting of the field of view of the camera, light source field of view, angle of the light emitted by the light source, and the relative position of camera and the light source.

Figure 26:
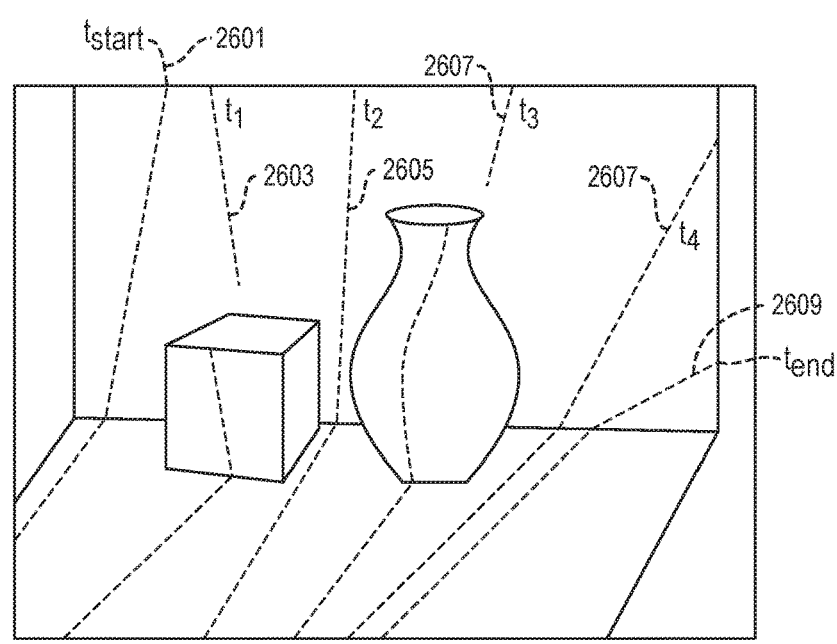
FIG. 26 is a conceptual diagram that illustrates a moving line of light produced by controlled movement of a light source, in an illustrative implementation of this invention.

FIG. 26 is a conceptual diagram that illustrates a moving line of light produced by controlled movement of a light source (not shown in FIG. 26). For example, in some cases the light source comprises an object that emits light, such as a laser or directional LED. In other cases, the light source comprises a specular surface (such as a galvanometer-actuated mirror) that reflects light. In the example shown in FIG. 26, a line of light sweeps across a scene, such that it intersects the scene at different spatial positions at times 2601, 2603, 2605, 2607, 2609.

Figure 27A:
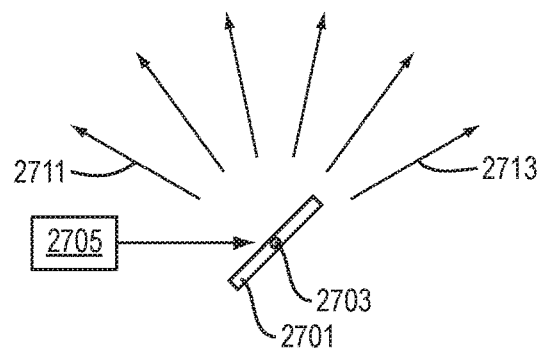
FIG. 27A is a diagram, which shows a rotating mirror that reflects a rotating line of light.
Figure 27B:
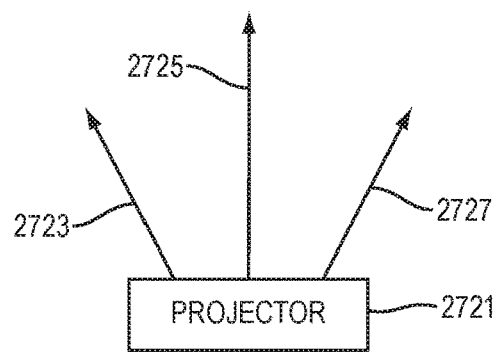
FIG. 27B is a diagram, which shows a projector that projects a moving line of light.

FIGS. 27A, 27B and 27D show three examples of light sources that produce a line of light that sweeps across a scene, in some implementations of this invention.

FIG. 27A is a diagram, which shows a rotating mirror that reflects a rotating line of light. The mirror 2701 rotates about axis of rotation 2703, which axis is perpendicular to FIG. 27A. A laser 2705 shines a laser beam through a Powell lens (not shown in FIG. 27A). The Powell lens transforms the laser beam into a plane of laser light. As the mirror rotates, the angle of the plane of reflected laser light varies as a function of time. For example, at one time during the sweep, the plane of the laser light is aligned with direction 2711, and at another time during the sweep the plane of the laser light is aligned with direction 2713.

FIG. 27B is a diagram, which shows a projector 2721 that projects a moving line of light. The line of light is aligned with different directions at different times. For example, the line of light is aligned, at different times, with directions 2723, 2725, 2727.

Figure 27C:
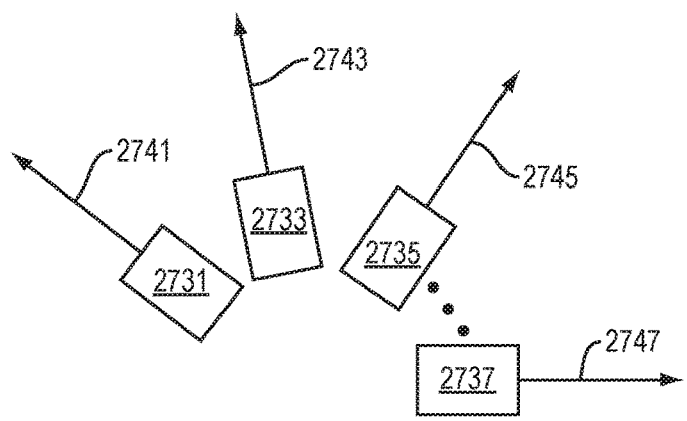
FIG. 27C is a diagram, which shows an array of directional light sources that, taken together, emit a moving line of light.

FIG. 27C is a diagram, which shows an array of directional light sources (e.g., 2731, 2733, 2735, 2737) that, taken together, emit a moving line of light. The line of light is aligned with different directions at different times. For example, the line of light is aligned, at different times, with directions 2741, 2743, 2745.

In illustrative implementations, 3D scanning is implemented as follows, for each superpixel: (a) n modulation signals are applied to n separate sets of pixels in a superpixel during a single camera frame, one modulation signal per pixel set, such that at least pixel in the superpixel is a member of each pixel set; (b) each modulation signal modulates the response of pixels to light from a scene, which light is incident on the pixel unit; (c) a computer determines a unique permutation of the n modulation signals, which permutation occurred at a time (the "hit time") when the intensity of light reflected from the scene and incident on the pixel unit reached a maximum for the frame; (d) a computer uses this unique permutation to perform a first algorithm to compute 3D coordinates of a point in the scene, which point is the position in the scene from which light reflected directly to the superpixel at the hit time; and (e) the first algorithm includes computing the 3D coordinates of the point by triangulation or includes accessing values from a lookup table, which lookup table was computed by a second algorithm that includes computing 3D depth by triangulation.

In some implementations, depth-sensing is implemented as follows: The n pixels in the superpixel record n separate modulation signals during a single frame of the camera, which correspond to the n bits of an n-bit code. A rotating mirror causes a plane of laser light to sweep across a scene during each camera frame. A complete sweep of the laser plane of light occurs during each camera frame. There are $2^n$ permutations of the n-bit code, corresponding to $2^n$ timeslots in each camera frame. The intensity of incident light at the superpixel is highest during a single timeslot in which the laser light reflects from the scene to the superpixel. Based on the permutation of the n modulation signals that is recorded by the superpixel at the "hit point" (when the intensity of incident light is highest), a computer determines the timeslot during which the hitpoint occurred. This timeslot in turn uniquely identifies the angle of rotation of the plane of laser light when the hitpoint occurred. From the angle of rotation of the plane of laser light, and from the known positions of the light source and of the pixel ray for the pixel, a computer calculates the 3D coordinates of the intersection of the pixel ray and the plane of laser light. This intersection is located at the scene point that directly reflected the laser light to the superpixel. This process is repeated for each scene point, yielding a cloud of computed 3D points in the scene.

In some 3D scanning implementations of this invention, one or more processors (e.g., in processing unit 2805 in FIG. 28) perform calculations that take the camera output, calibration, and other static or dynamic parameters, and produce a description of the scene, including a 3D reconstruction of the surface geometry of the scene.

Figure 28:
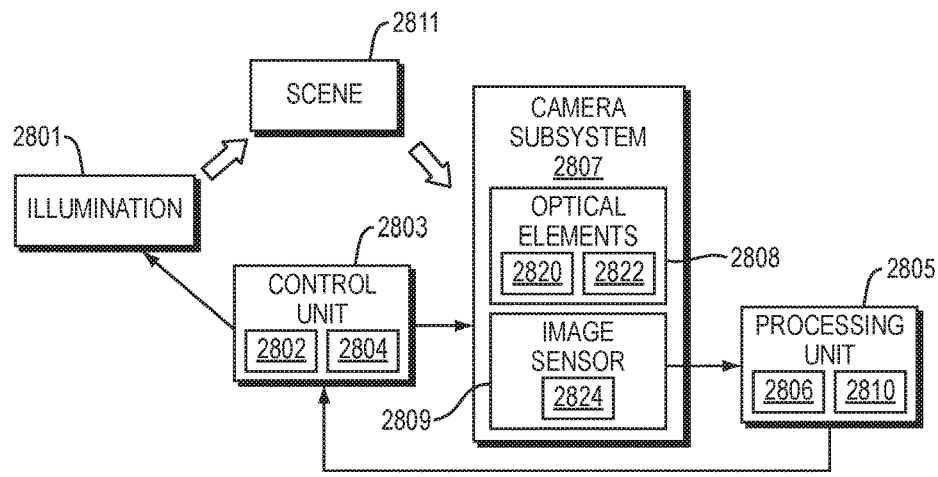
FIG. 28 is a block diagram of hardware components.

In some 3D scanning implementations of this invention, binary Gray code of length 9 is used for pixel set modulation. The illumination subsystem projects a sweeping laser line. The 9-bit vector represents the time t (within the frame $0<t<T_{frame}$) at which the laser line passed that part of the image which contributes to the camera pixel illumination (under the assumption that the scene is consistent—i.e., that there is no excessive reflection and scattering). The output of the camera pixels is used to decode the 9-bit vector and the time t within the frame. The time t identifies the position of the laser line and therefore identifies a plane in the space (due to the fact that the optical system is aligned with known parameters). With this information, one or more processors identify a point in 3D space using a triangulation technique FIG. 28 is a block diagram of hardware components of a 3D scanning system, which components comprise an illustrative implementation of this invention. The scanning system comprises an illumination subsystem 2801, control unit 2803, processing unit 2805, and camera subsystem 2807. In this system, one or more signal generators (e.g., 2802, 2820, 2806) or one or more computers (e.g., control unit 2803 or processing unit 2805) causes separate modulation signals to be created, which modulation signals control the sensitivity of multiple sets of pixels in the imaging sensor 2809 in camera subsystem 2807.

The signal generators (e.g., 2802, 2820, 2806) comprise one or more signal generators, function generators, digital pattern generators, frequency generators or any other electronic device that generates repeating or non-repeating electrical signals, including either digital or analog signals. The system includes one or more computers (e.g., control unit 2803 or processing unit 2805), which include memory devices (e.g., 2804, 2810)

The illumination subsystem 2801 comprises a laser 2921, optics 2923, and a galvanometer-actuated optical scanner 2925. The optics 2923 comprise a Powell lens 2927 (for changing a dot of laser light into a line of laser light), a mirror 2929, and another lens 2913.

The camera subsystem 2807 comprises optical elements 2808 and image sensor 2809. The optical elements 2808 comprise any optical elements used to transfer or direct light from the scene to the sensor, or to filter the light from the scene. The optical elements include lenses 2820 (e.g., adjustable lenses) arranged in an appropriate (static or dynamic) position, and other optical elements 2822. For example, in some cases, the other optical elements 2822 include (i) one or more spatial light modulators, mirrors, filters, optical fibers, or other light modulators or devices for attenuating, transferring, filtering, or directing light, and (ii) any adjustable optical elements that transfer, or direct light from the scene to the sensor (e.g., adjustable aperture shape, adjustable aperture size, adjustable aperture position, or other), or to filter the light from the scene (e.g. wavelength, polarization, incident angle, incident position of other). The adjustable optical elements are controlled by control unit 2803.

The camera subsystem 2807 is a system for capturing images of the scene 2811 using image sensor 2809. The image sensor consists of plurality of pixels (e.g. thousands of pixels, or millions of pixels, or billions of pixel, or any other number).

During 3D scanning, the galvanometer-actuated optical scanner 2925 controls mirror position and thus the direction of the projected line of laser light.

The position/orientation of camera subsystem and illumination subsystem is fixed for the life-time of the system. The illumination subsystem comprises the controlled laser light deflection system. The baseline is the distance between camera center and the light deflection system (the position of galvanometer-actuated mirror). The control unit 2803 controls the orientation (angle) of the galvanometer-actuated mirror by applying of time-changing electrical signal. The mirror reflects the laser line, which creates a continuous sweep of the plane illuminated by the laser line. The value of the control signal is continuous and is any signal between minimal value (correspond to boundary angle of the mirror—$\alpha_{min}$) and maximal value (correspond to second boundary angle of the mirror—$\alpha_{max}$). The angle of the mirror changes from $\alpha_{min}$ to $\alpha_{max}$ in linear fashion proportional to control signal.

The operator calibrates the system at least once. During the calibration, the operator uses an automatic/semi-automatic calibration process to calibrate internal parameters of the camera. To calibrate the mutual position/orientation of the camera subsystem and the laser plane in any given angle $\alpha$, the operator performs triangulation The position/orientation is calibrated in predefined angles $\alpha_i$ (i$\in$0 . . . n−1; $\alpha_0 = \alpha_{min}$, and $\alpha_{n-1} = \alpha_{max}$). The algorithm calculates the equation of the plane defined by the laser line for every angle of deflection mirror $\alpha_i$, as follows: $n_{ix}*x + n_{iy}*y + n_{iz}*z + d_i = 0$, where x, y, z are Euclidian coordinates in world coordinate space;

$n_i$ is the 3D normal vector of the plane (the angle between $n_i$ and $n_{i+1} \leq \pi$ rad). And $d_i$ is the orthogonal distance between the plane and the center of the origin.

The computed equations are stored in memory. In runtime, the algorithm computes the equation of the plane for any other a between $\alpha_i$ and $\alpha_{i+1}$ ($\alpha_i < \alpha_{i+1}$) using interpolation. While the angle of the mirror is controlled by linear signal, a computer calculates the exact plane equation for any $\alpha$ i (the algorithm computes new normal vectors n and d. At first, it uses binary search to find indexes i and i+1. The n lies in same plane as $n_i$ and $n_{i+1}$. The angle ∡ |n; $n_i$|: ∡ |n; $n_{i+1}$|=|$\alpha-\alpha_i$|:|$\alpha_{i+1}-\alpha$| and ∡ |n; $n_{i+1}$|+∡ |n; $n_{i+1}$|=∡ |$n_i$; $n_{i+1}$| (symbol "∡ |; |" means the angle between vectors, symbol ":" means the ratio between two real values). The distance $d = d_i + [(\alpha-\alpha_i)/(\alpha_{i+1}-\alpha_i)]*(d_{i+1}-d_i)$–(symbol "/" means division of real numbers and symbol "*" means multiplication of real numbers).

During operation, the control unit controls the angle of the deflection mirror and the modulation signals to individual sets of pixels. The system works in cycles (frames). One cycle comprises a setup phase, exposure phase, readout phase, processing phase and output phase. The individual phases are processed in a pipeline, so that the exposure phase of the current frame is executed simultaneously with the processing phase of previous frame.

During the setup phase, the control unit prepares the illumination subsystem and the camera subsystem for the upcoming exposure phase. This preparation includes image sensor reset, preparation of modulation signals (from the modulation functions), setting of image sensor exposure, setting the angle of deflection mirror to $\alpha_{min}$, and adjusting the power of the laser. In some implementations, control unit perform other preparatory steps.

During the exposure phase, the control unit sends the signal to illumination subsystem, to turn on the laser source and to change the angle of deflection mirror. If T is the time of frame exposure in seconds ($0 \leq t \leq T$ s). Control unit changes the angle $\alpha$, such that=$\alpha_{min} + (t/T)*(\alpha_{max}-\alpha_{min})$.

In some implementations, the dependency between angle of deflection and the time during exposure is nonlinear.

The control unit applies the modulation signals to individual pixel sets. For example, in some cases, a 9-bit binary Gray code is used to drive the modulation of individual pixel sets. The 9-bit Gray code can encodes 512 discrete codewords $C_{xy}$. The time T is divided into 512 individual time periods $T_i = <t_i, t_{i+1})$ (i$\in$0 . . . 511) of the same duration ($|T_i| = T/512$), so that, in succession of the coding, each time period have its own 9 bit codeword (000000000, 000000001, 000000011, 000000010, . . . ). During the frame, in any time t ($t_{hit}$) fits into some interval $T_i$. During the interval $T_i$, the associate codeword is used by control unit to modulate response of the pixel sets. The first pixel set is controlled by first bit of the codeword, the second set is controlled by second bit of the codeword, . . . , the ninth set is controlled by ninth bit of the associated codeword (if particular bit is 0, the all pixels from the particular pixel set are "off", if the bit is 1, the pixels are "on"—responsive to light).

The method described here for a 9-bit gray code is the same as the method for a 5-bit gray code that is shown in FIG. 3, with appropriate modifications for the different number of bits in the code.

During the readout phase, the control unit sends control signals to the camera subsystem to read the image. The image is send to the processing unit.

In processing phase, the raw image from the camera is split into 9 different sub-images. This images have the same structure as superpixels. First sub-images consists of image values captured by the pixels in first pixel set. The second sub-image consists of image values captured by the pixels of second pixel set, . . . , the ninth sub-image consists of image values captured by the pixels of the ninth pixel set. All nine sub-images have the same resolution. The sub-image matrix P is an image, where every pixel have 9 values from particular sub-images ($v_1$, . . . , $v_9$). The value of the sub-image matrix is an 9D intensity vector (the components of the vector corresponds to specific sub-image pixel value). Because pixels in a superpixel are in proximity, the individual pixels in the superpixel captures the light from approximately the same area. The centers of the superpixels are treated as centers of pixels in sub-image matrix (for purposes of geometric computations).

Each pixel in sub-image matrix P captures light from a part of the scene (either part of the object of interest, or the background of the area of interest). If the illumination module does not illuminate the area of interest, the pixel captures no light, other than any ambient light. If the illumination module illuminates the area of interest, it illuminates the area in unknown time t (it is in general a very short period of time giving the angular movement of the deflection mirror). When this happens during exposure during a camera frame, t$\in T_i$. In time period $T_i$, the response of the pixel sets are modulated by i-th codeword. Thus, the light hits the area of interest in time period $T_i$. In this period, only a portion of the pixel sets are "on" based on the bits of the particular codeword. The 9D intensity vector of P is ($v_1$, $v_2$, . . . , $v_8$). Intensity values that correspond to pixel sets that are "on" during $T_i$ are higher that a threshold (while they receive the reflected illumination from the area of interest). Intensity values that correspond to pixel sets that are "off" capture no light, so the values are below the threshold. This binarization by the threshold creates an 9-bit codeword. By decoding this codeword (e.g., GrayToBinary in FIG. 4), a computer calculates the index of the time interval i (Timeslot). Thus, this algorithm decodes the time t—with the accuracy of up to T/512 (as the center of the timeslot $T_i$). The codeword 000000000 is reserved for pixels that was not lit by the illumination subsystem. The 3D coordinate of (0, 0, 0) is sent to output for such pixels.

For the time t, the processing units computes the plane equation of the plane of laser light that correspond to the particular angle α of the deflection mirror. Using this plane equation and data gathered during calibration of the camera subsystem, a computer computes the intersection of the plane and the pixel ray for the superpixel. The pixel ray is the half-line along which light from the scene travels to the center of the superpixel. The intersection is a 3D coordinate in world coordinate system, and it is saved as an output value for the particular pixel P. The algorithm is executed for all pixels of the sub-image matrix.

In output phase, the control unit sends the computed 3D coordinates out of the system.

In an illustrative embodiment of the system, the projector space correspondence is encoded into code for pixel modulation. Thus, the 3D coordinate is computed for every pixel of sub-image matrix separately.

Figure 29:
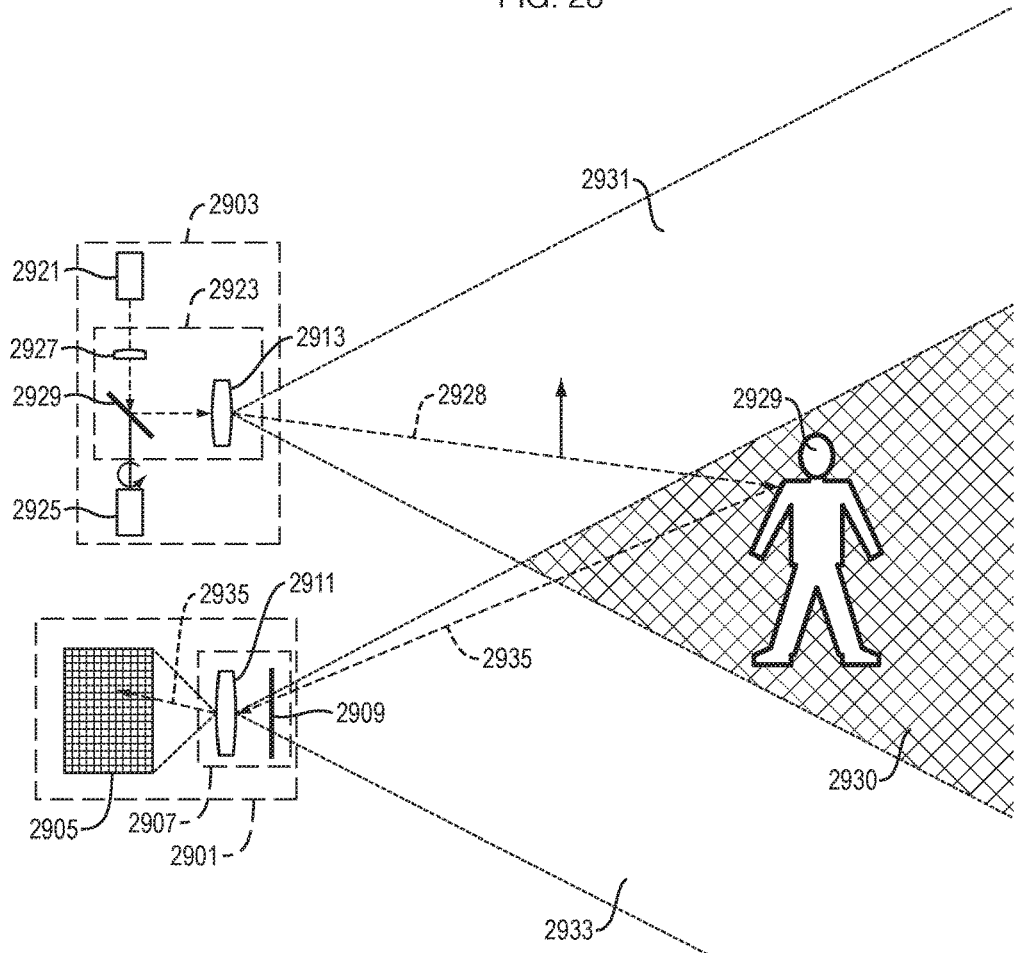
FIG. 29 is a diagram of a 3D scanning system.

FIG. 29 is a diagram of a 3D scanning system that includes modulatable superpixels, in an illustrative implementation of this invention. The system includes a camera subsystem 2901 and an illumination subsystem 2903.

In some implementations of the system, the illumination subsystem comprises a laser 2921, optics 2923, and a galvanometer-actuated optical scanner 2925. The optics 2923 comprise a Powell lens 2927, a mirror 2929, and another lens 2913. During scanning, the galvanometer-actuated optical scanner 2925 controls mirror position and thus the direction of the projected line of laser light.

In the example shown in FIG. 29, laser light 2928 is projected toward the scene 2929. The scene is within both the illumination subsystem's field of view 2931 and the camera subsystem's field of view 2933. The projected light is reflected 2935 from the objects in the scene or surrounding walls toward the camera subsystem.

In the example shown in FIG. 29, the illumination subsystem projects a laser line into its field of view. The projected light 2928 is reflected from the scene 2929, and passes though the camera optics 2907. The camera optics 2907 include a filter 2909 and a lens 2911. The reflected light 2935 then falls onto image sensor 2905. The laser light 2928 completes a sweep of the scene during each frame.

In some embodiments, a mechanical deflection system is used to change the direction of the projected light. For example, in some cases, the deflection system comprises a galvanometer-actuated optical scanner, MEMS mirror or polygonal mirror. In some cases, a sensor for detecting the angle of rotation of the mirror is included in the illumination subsystem.

Figure 30:
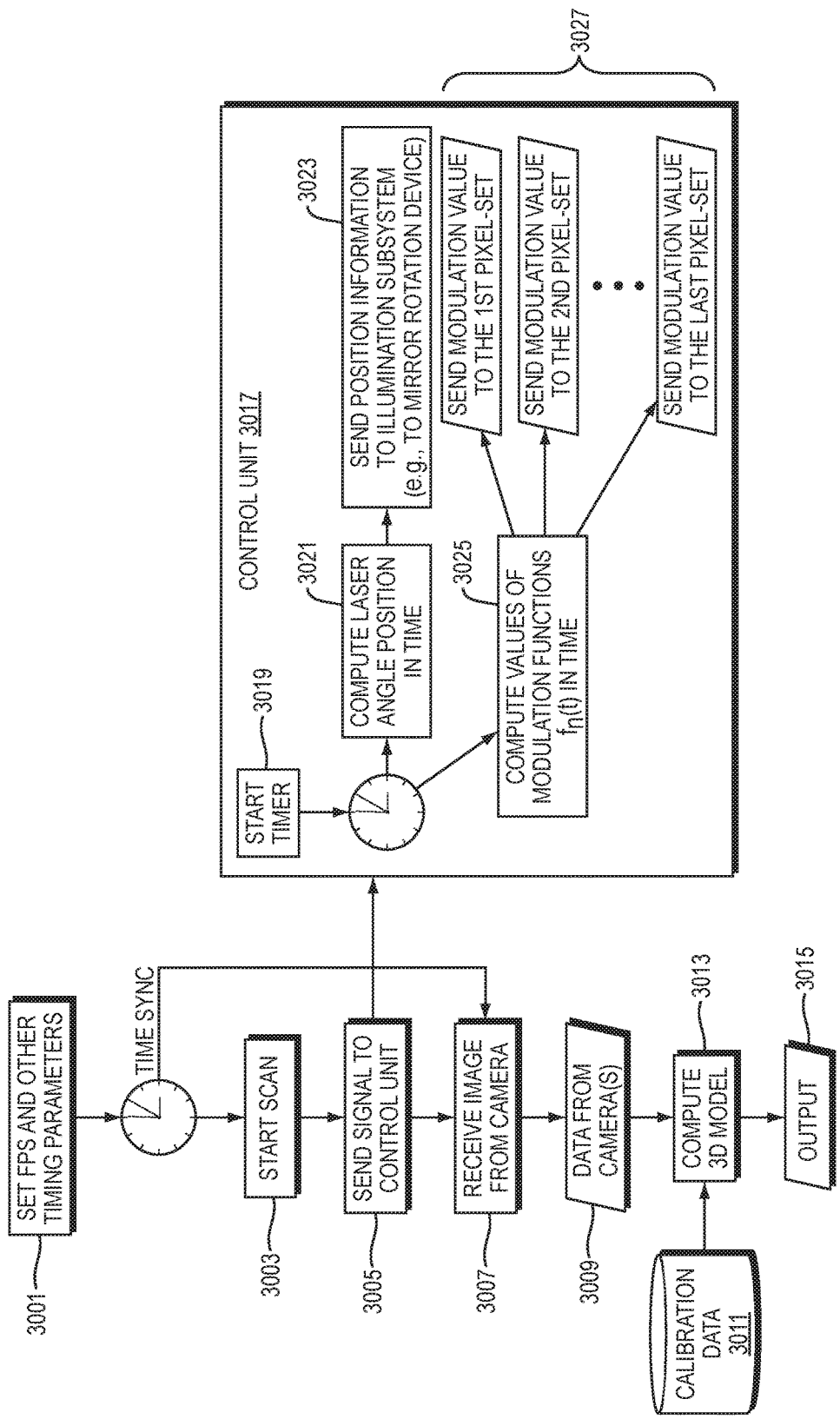
FIG. 30 is a flowchart that shows steps in a method of 3D scanning, in which different pixel sets are separately modulated.

FIG. 30 is a flowchart that shows steps in a method of 3D scanning. In the example shown in FIG. 30, desired timing parameters (such as the number of frames per second) are set. (Step 3001). The timer is activated; it triggers the frame capture at the desired frame rate. (Step 3003). The system sends signals to the control unit (Step 3005). The control unit 3017 has a timer which is started at the beginning of each frame (Step 3019). According to the time provided by the control unit timer, the control unit computes the modulation information for each of the pixel sets (Step 3025) and computes the position information for the illumination subsystem (Step 3021). The modulation signals are sent to the respective pixel sets (Step 3027). The positioning signal is sent to the illumination subsystem (Step 3023). At the end of the frame (which is determined by the timer to be in sync with the desired frame rate), a processing unit receives data from the camera (Step 3007). Using the data from the camera 3009 and previously gathered calibration data 3011, a computer calculates a 3D model (Step 3013) and sends it as output (Step 3015).

Figure 31:
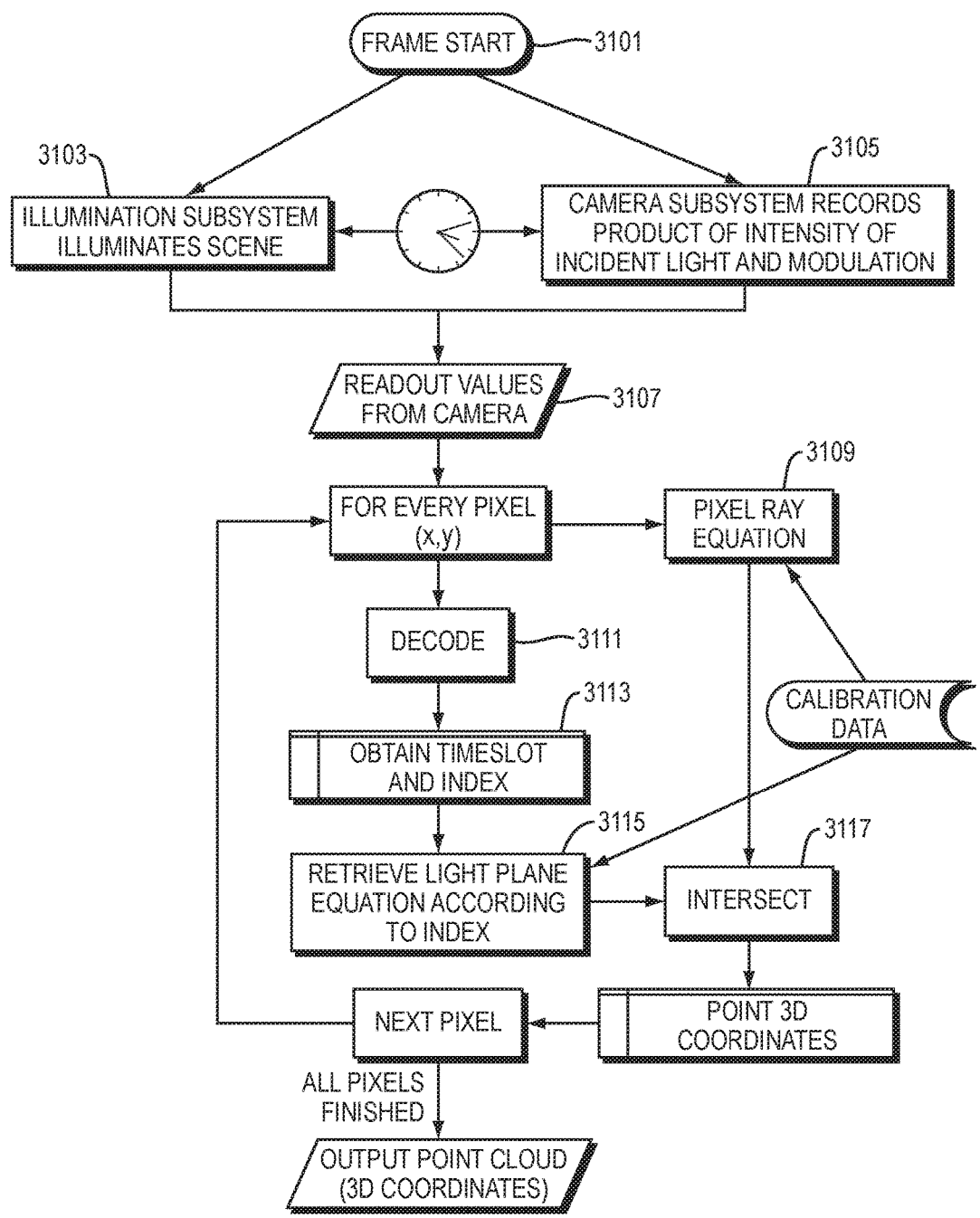
FIG. 31 is a flowchart that shows steps in a method of 3D scanning, in which a timeslot is calculated.

FIG. 31 is a flowchart that shows steps in a method of 3D scanning, in which a timeslot is calculated. In the example shown in FIG. 31, the steps of the method include frame start 3101, illumination 3103, recording intensity 3105, reading values from camera pixels 3107, comparing to thresholds, producing code, decoding 3111, obtaining a timeslot and index 3113, according to index, retrieving a mathematical equation of the set of pixels illuminated during the timeslot 3115, computing pixel ray equation, which is the equation of a ray from the center of the camera pixel to the scene 3109, and computing an intersection of these two mathematical equations 3117.

Figure 32:
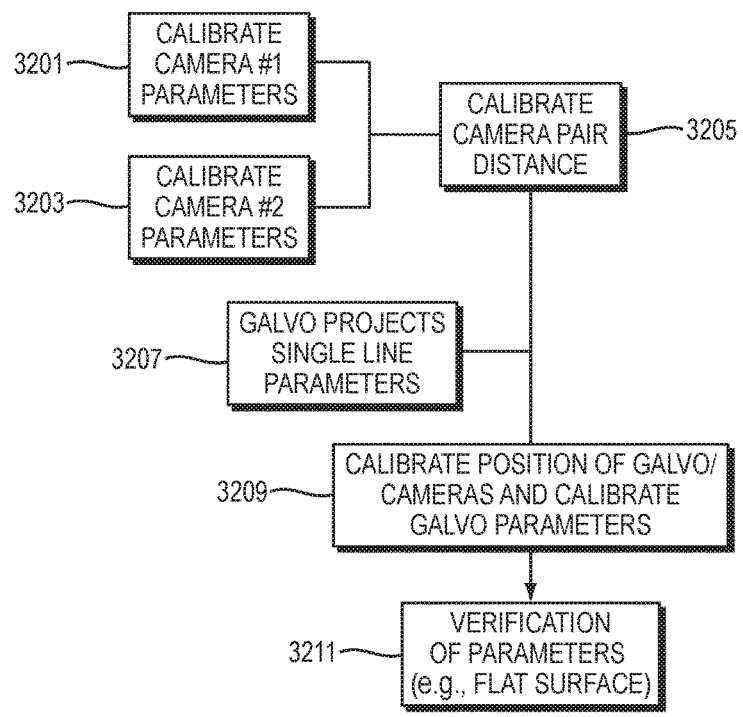
FIG. 32 is a flowchart that shows steps in a method of calibrating a 3D scanner.

FIG. 32 is a flowchart that shows steps in a method of calibrating a 3D scanner. These steps include: Calibrate parameters of a first camera 3201. Calibrate parameters of a second camera 3203. Calibrate camera pair distances 3205. Use a galvo-actuated light source to project single line parameters 3207. Calibrate position of the galvo-actuated light source and cameras and parameters of the light source 3209. Verify parameters (e.g., by 3D scanning a flat surface) 3211.

For example, in some cases, a calibration method includes the following steps. First, parameters of each single camera are determined using a calibration pattern. A precisely printed or etched calibration pattern is placed at different locations in the view of camera. The locations evenly cover the desired range and field of view of the camera. In many cases, the camera takes at least 10 pictures of the calibration pattern. Then a computer runs algorithm on this input to calculate the matrix in standard format, containing the determined parameters of a camera. If the mathematical uncertainty indicated by the algorithm is not below a desired threshold, the process is repeated.

This is repeated for all cameras, one by one.

After all cameras all calibrated, the positions of the cameras relative to each other are determined. One camera, the first one (#1), is selected as the primary reference point from which the relative position of other cameras is determined. For each pair of camera #1-camera #x, at least 10 pictures of the calibration pattern, shot from both cameras, are taken. The pattern is placed in different location, facing the cameras, so as to evenly cover the desired range and field of view of the cameras. An algorithm takes the images as an input and computes the relative positions of the cameras. If the mathematical uncertainty indicated by the algorithm is not below a desired threshold, the process of determining the positions of the cameras is repeated with newly taken images.

After this, the position and projection parameters of the light source(s) are determined. A flat white object is placed in front of the system, so that the light from the source is reflected and the image of the projected line can be taken by the cameras. The light source projects a number of single-line patterns, covering its whole range. The flat white object is then placed in a different distance and the process is repeated. The flat white object is placed in at least 5 positions at different distances so as to evenly cover the desired range of the system.

Images of the patterns are provided as input for algorithm computing the relative position of the galvo, and the parameters of the projection (mapping of numeric inputs given to galvo to the real angle of projected line). If the mathematical uncertainty indicated by the algorithm is not below a desired threshold, the process of determining the position of the galvo and its parameters is repeated with newly taken images.

After this, a verification step is done. The images collected in the previous step are provided to the triangulation algorithm which computes the 3D position of two points of each projected line. A plane is mathematically computed to be the best fit for the lines taken while the flat white object is at one distance. A next position of the flat white object produces another plane, etc.

In this method, if the system uses one camera, an additional second camera is temporarily, but rigidly attached to the system. The additional camera is detached after the calibration process is accomplished Here is another non-limiting example of a calibration technique, used in some implementations of this invention. In this example, the calibration parameters consist of an internal part and an external part. The internal properties of the camera include local behavior of projection, the camera matrix and the parameters of lens distortion model. The external properties include the position/rotation of the camera in respect to world coordinate system.

All parameters are calculated by an automatic or semi-automatic process. In this process, the cameras captures known calibration pattern (e.g. FIG. 33) in multiple different positions/orientations (FIG. 34). The automatic algorithm computes the position of the individual circles of the pattern. Each individual circle has encoded the position of its center in pattern coordinate space (in metric coordinates).

When the system knows the internal parameters of the camera and the position/orientation of the calibration pattern, the position of each individual center of circle (in world coordinate space) is projected to camera coordinate space (projected coordinate). Position of each circle is computed (image coordinate). The reprojection error is the difference between projected coordinate and the image coordinate for each circle.

At the beginning of the process, the internal parameters of the camera and the position/orientation of calibration patterns are unknown. A computer calculates the parameters using an optimization technique to minimize reprojection error for all captured images of calibration pattern (e.g. mean square error).

After the internal parameters of all cameras are calculated, the same captured patterns are used to determine the position of individual cameras with the optimization technique to minimize reprojection error.

Alternatively, other calibration techniques may be used, such as mechanical alignment of components to exact locations.

Figure 33:
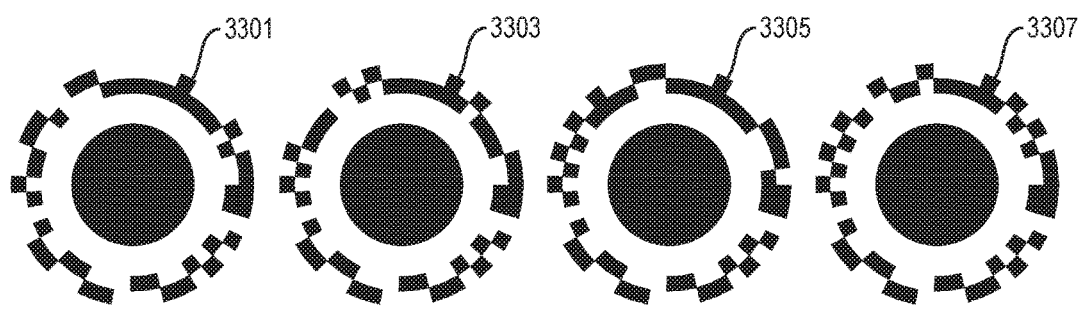
FIG. 33 is a diagram that shows four examples of circles used in an optical calibration pattern.
Figure 34:
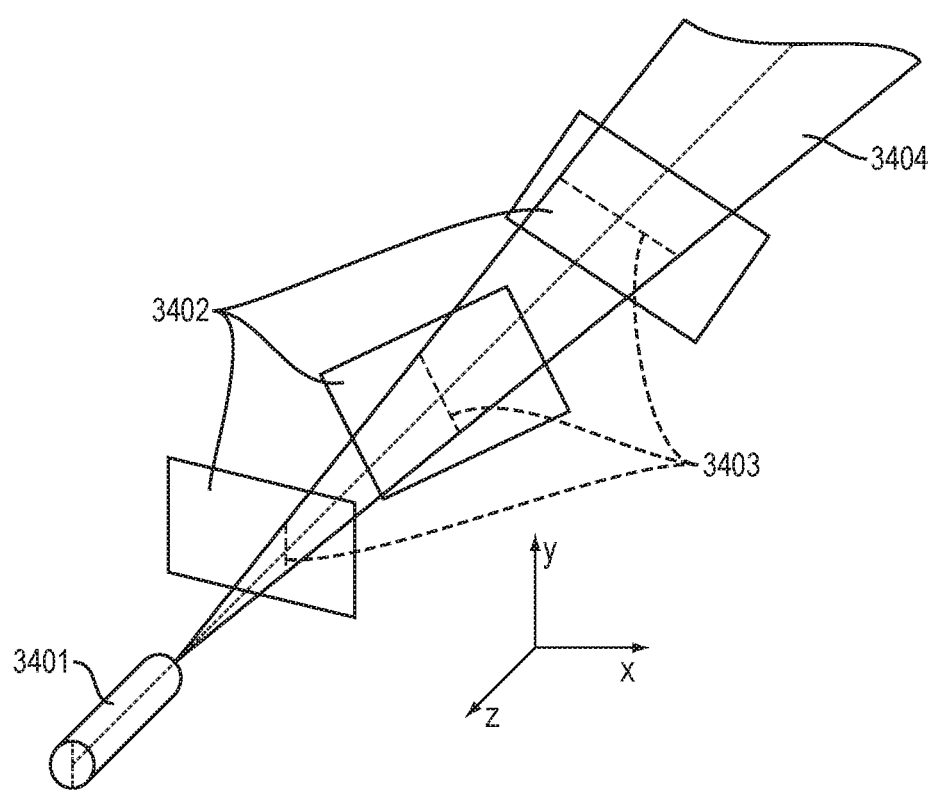
FIG. 34 is a diagram that shows examples of use of calibration patterns.

FIG. 33 is a diagram that shows four examples of circles used in an optical calibration pattern. In some cases, an optical calibration pattern comprises a large number of such circles. Each circle in calibration pattern (e.g., 3301, 3303, 3305, 3307) is encoded with a unique visual code, and thus each circle in the calibration pattern is uniquely identifiable.

FIG. 34 is a diagram that shows use of a calibration pattern. A calibration pattern is precisely printed or etched on a planar surface. The calibration pattern is placed at different locations 3402 in the view of a camera 3401. The locations evenly cover the desired range and field of view of the camera. In some cases, the camera captures 10 or more pictures of the calibration pattern. In FIG. 34, dashed lines 3403 indicate the projection 3403 of a plane of laser light 3404.

Coordinate System

In illustrative implementations, computations for 3D scanning involve use of coordinate systems. A wide variety of coordinate systems may be used.

Here is a non-limiting example of a coordinate system that is used in some implementations of this invention, for purposes of triangulation and calibration. In illustrative implementation, the image sensor consists of plurality of pixels (e.g. thousands of pixels, or millions of pixels, or billions of pixel, or any other number). The pixels are arranged in 2D matrix, forming an 2D coordinate system (u, v), which is the image coordinate system. Every position on the image sensor is described by 2 real numbers (u, v)—2D vector from $R^2$. The coordinates lies in interval (<0, U-Resolution, <0, V-Resolution>), where U-Resolution is the horizontal number of pixels in the image sensor, and V-Resolution is the vertical number of pixels in the image sensor.

In some cases, the image plane is a planar surface and the coordinate system consists of 2 orthogonal axes U and V. In another implementation of the invention, the image sensor is a curved surface.

Light reflects from the objects in the scene, passes through camera optics (including, in many case, a lens) and forms an image on the sensor surface. The image captured by the image sensor has the same coordinate system as the image sensor. The camera has a camera center and the image plane is in front of the camera center. The perpendicular distance between camera center and image plane is equal to the focal distance) of the camera. The line perpendicular to the image plane, which crosses the camera center is the principal axis. The intersection of the principal axis with the image plane is called the principal point (p).

The camera coordinate system is a local Cartesian coordinate system with 3 orthonormal axes. The origin of the coordinate system is in the camera center c. The x-axis has the same direction as the sensor's u-axis, the y-axis has the same direction as v-axis and the z-axis has the same orientation as principal axis). Each camera subsystem has its own Camera coordinate system. The coordinate system of the scene, the World Coordinate System, is a global coordinate system. The coordinate transforms between any camera coordinate system and the world coordinate system are standard coordinate conversions (represented by a coordinate conversion matrix and its inverse transform). The camera coordinate system is the same as camera subsystem coordinate system. The coordinate conversion matrix $R_t$ is $$R_t = \begin{pmatrix} r_{1,1} & r_{1,2} & r_{1,3} & t_1 \\ r_{2,1} & r_{2,2} & r_{2,3} & t_2 \\ r_{3,1} & r_{3,2} & r_{3,3} & t_3 \end{pmatrix}$$

where, $r_{i,j}$ is rotation parameter, and $t_i$ is translation parameter.

The projection from world coordinates to image coordinates is performed as follows. The world coordinate of a point in the scene is $x_h = (x, y, z, 1)^T$—in homogeneous coordinates. World coordinates are converted to camera coordinate space by matrix multiplication, as follows:

$$x = R_t * x_h$$

Point x is projected to a normalized image plane (which is located at a focal distance of 1 from the camera center). The coordinates of Point x in the scene, as projected to the normalized image plane, are $$x_n = \prod * x, \text{ where } \prod = \begin{pmatrix} 1 & 0 & 0 & 0 \\ 0 & 1 & 0 & 0 \\ 0 & 0 & 1 & 0 \end{pmatrix}$$

To convert to image coordinates $x_i$, the $x_n$ is multiplied by a Camera Matrix A (which represents camera intrinsic parameters)

$$A = \begin{pmatrix} \alpha_x & 0 & x_0 \\ 0 & \alpha_y & y_0 \\ 0 & 0 & 1 \end{pmatrix}$$

$$x_i = A * x_n$$

In some implementation of the system, a transformation E (mapping 2D homogeneous space to 2D homogeneous space) compensates (at least partially) for optical distortion of the lens system. The image coordinate is computed as follows.

$$x_i = A * e[\Pi * (R_t * x_n)]$$

Having specific location of the pixel $x_i$, there exist a bijection between image coordinates of a point $x_i$ and a corresponding normalized coordinates $x_n$, (coordinates on normalized image plane). Having the normalized coordinates $x_n$, there exists an infinite number of points, each projecting to $x_n$ on the normalized image plane. All of these points lie on a half-line (ray). The equation of the half line is $$x = c + (x_n - c) * d$$

where x is a vector of coordinates of a 3D point in space, c is a vector of a coordinates of the center of the camera (3D point), $x_n$ is a vector of normalized coordinates of the point $x_i$ and d>0 is a real number equal to the distance (parameter). The symbol "*" is the multiplication of vector by scalar.

This relation between 2D image coordinate and the 3D half-line is called image point/coordinate re-projection.

In some alternative implementations of the invention, a more complex geometrical model is used. In this model, the projection of a pixel into space is treated as a distribution function of possible light participation on a final pixel intensity.

In some cases, a 3D scanning system employs triangulation to determine depth and a plane of laser light to illuminate the scene. In such a laser triangulation system, the calibration is sometimes performed as follows. The calibration is done in iterations. At first, the method for calibrating the camera subsystem(s) is performed as stated before. For calibrating the surface in the space, which is lit by the laser, calibration pattern comprising of multiple circles (such as 3301, 3303, 3305, 3307) is used. In the process, each of the camera subsystem captures images of the calibration pattern (the white areas comprise a diffuse surface with albedo near 1, the black areas comprise a diffuse surface with albedo near 0.5).

The calibration pattern is printed on a stable planar surface (e.g. on top of glass table). During the exposure of the camera, the mutual position of the camera subsystem(s), the laser and the calibration pattern is fixed. At first, the camera(s) captures the image of a calibration pattern illuminated by ambient light, while the laser is off.

From this frame, for every camera, the algorithm computes the equation of plane, which corresponds (during this step of calibration) to the planar surface of the calibration pattern (This part of the process is a sub-part of the camera calibration).

The position/orientation of all elements of the system stays fixed, while camera(s) take image of the pattern lit by the laser (the laser is turned on before the second exposure). The laser light projects image features (curve of highly illuminated points) on the captured image of the calibration pattern, which show multiple positions of the calibration pattern. The algorithm detects these features using thresholding and finds the points of said curve with subpixel accuracy by finding the center of gravity of the intensity values in the cross-section of the said curve (a different sub-pixel strategy may be used). For example, if the projection of the laser light in the image is a curve maintaining vertical direction, the algorithm processes the image row by row, analyzing the center of gravity of the laser light in all image rows (if there are points above the threshold). The representation of the curve is a continuous (from a geometrical point of view) chain of 2D image coordinates. The algorithm re-projects these coordinates into 3D, which gives a set of half-lines directing from camera center.

After that, the algorithm computes the 3D intersections of half-lines with the plane of the calibration patterns. These 3D coordinates are stored in memory as the chain (sample), which is a 3D representation of the projection of the laser light. The operator then changes the position of the calibration pattern (in some implementations, a robotic arm automatically changes the position of the calibration pattern), so that the new position of the calibration pattern defines a plane, that is different from all previous. During the calibration process, the operator/robot places the calibration pattern to multiple positions to ensure homogeneous coverage of measured samples in the measurement range of the system. After sufficient number of samples is captured (at least 2), a geometrical representation of the laser illuminated 3D surface (e.g. ruled surface) is computed by minimizing the error (e.g. mean square distance) of measured sample points and the geometrical representation of the surface.

Triangulation

In some implementations, the system computes the 3D position of the surface points in the field of view of the camera subsystem. For every pixel of the camera, the algorithm computes a pixel ray. The pixel ray is the re-projection (the half-line from the camera center). To compute the exact 3D position along the half-line, the algorithm computes d in the equation using an additional constraint. Specifically, the additional constraint is that the plane and the half-line line going from the camera center through the pixel are never parallel, i.e. there is always an intersection (as discussed below). In some implementations, the distance d is computed directly and substituted into the equation. In some implementations, the distance d is computed from triangulation principle. The additional constraint is either a plane or second half-line where the specific point lies.

For the plane as additional constraint (the plane and the pixel's re-projection can not be parallel), the 3D point x for a specific pixel p has to satisfy 2 criteria:

$$x = c + (x_n - c) * d$$

$$n_p \cdot x + d_p = 0$$

where $n_p$, is a 3D normal vector of the plane, $d_p$ is the Euclidian distance between the plane and the origin of the coordinate system and symbol "·" is the dot product of two 3D vectors. To get the exact 3D point x, the algorithm performs an algorithm to compute unknown d:

$$d = (n_p \cdot c + d_p) / (n_p \cdot (c - x_n))$$

where symbol "/" is the division of real numbers.

Because the line and the plane are not parallel, it follows that $(n_p \cdot c - n_p \cdot x_n)$ is non-zero, and that d exists. A computer calculates x if the d is >0.

$$x = c + (x_n - c) * (n_p \cdot c + d_p) / (n_p \cdot (c - x_n))$$

In some implementations, 3D position of a surface points in the scene is retrieved using laser light, camera and triangulation technique. For example, the system shown in FIG. 28 uses laser triangulation. Laser light emits from the illumination subsystem 2801 in form of laser line(s), laser dot(s) or different light shape (e.g. Ruled surface in 3D). The mutual position and orientation of every Illumination subsystem and every camera subsystem is known in any time t. In time t, the Illumination subsystem emits light on the scene 2811. For every pixel of the camera, if the laser illuminates a part of the scene that is observed by the pixel, the processing unit 2805 computes the 3D position of the illuminated part of the scene. All points illuminated by the laser lies on a defined 3D surface in the scene. The pixel of the camera collects light from a ray. The 3D point lies on intersection of this ray and the surface defined by the laser. In some cases, there is more that one such intersection and the processing unit chose the final 3D position by other regularization criteria.

In some implementations of laser triangulation, the simple equation of plane is chosen as the representation of the laser illuminated 3D surface. In this case, the algorithm for plane fitting (based on principal components) is used.

In some implementations of laser triangulation, the mutual position and orientation of the laser and the camera does not change over time. However, the position, and orientation of the laser source could change in time in a well controlled manner (e.g. mechanical change in position, rotation, deflection by mirror). In this case, the calibration is performed for fixed number of different laser source positions/orientations. The equation of the laser illuminated surface for all other positions/orientations are computed using sufficient mathematical model and interpolation.

In many implementations of triangulation, profile inspection is performed. In that case, the illumination subsystem comprises the laser line source. During the measurement, the laser light illuminate single profile of the scene, the camera subsystem captures the projection of the laser light and the algorithm analyze the image with the approach used in part of calibration. The 3D points represents a profile of the measurement.

Multiple Camera Subsystems

In some implementations, the 3D scanning system includes two camera subsystems. For each camera and each pixel, the algorithm computes time t of the light peak. The values are stored in time images (the pixel of the images are the values of t).

The first camera subsystem is primary. For every pixel of the primary camera, the algorithm computes the pixel re-projection. The corresponding 3D points lies on epipolar lines in the image of the second camera. On the time image of the second camera, the epipolar line cuts the image, which creates a 1D function of time values. The algorithm computes any value on the epipolar line using bilinear interpolation from adjacent pixels. The corresponding projection of the surface point lies on the epipolar line and have the same time t, as the pixel form the primary camera. The algorithm computes the position of the value t in the 1D function (with subpixel accuracy using bilinear interpolation). This position corresponds to pixel position on the second camera. The algorithm re-projects the pixel position as a half-line in 3D. The algorithm computes the 3D point as an intersection of two half-lines. An advantage of this approach is higher robustness and accuracy, while the geometry calculations are not dependent on calibration of Illumination subsystem Alternative Implementations In some implementations of the system, the system comprises plurality of illumination subsystems. In some implementations of this invention, the features in the scene are formed artificially by an illumination subsystem. There are different coding strategies that create specific coding for different points in the scene. This allows for more robust and accurate feature detection and position estimation.

In some implementations, this invention operates in multiple modes. One such mode is a high spatial resolution mode, which uses the same modulation signal for all pixels. The pixels from different sets are combined to produce one high spatial resolution image. In this mode, all pixels in the imaging sensor act like one pixel set. The ability to switch to this mode allows the scanner to select between real-time (lower resolution) mode and non-real-time (multiple sequential camera frames) high resolution mode for a more precise reconstruction.

Alternatively, this invention may be implemented as follows: An aluminum box may serve as a cover for a 3D scanning system. Inside the box, each of the following components are placed: a camera with ability to regulate the response of its pixels (globally), a (visible) red light laser, rotating mirror, Powell lens, and electronics that drive the rotating mirror. The Powell lens is a special kind of lens which transforms a laser dot to a line. As the mirror rotates according to the signal from the computer, the laser line sweeps along the scene over an angle of about 30 degrees. Instead of having multiple sets of pixels in the imaging sensor during a single frame, the scanner uses only one set of pixels and gathers multiple image frames. This alternative embodiment is well suited to 3D scan with high spatial resolution, but is not well suited for scanning a moving object.

In some cases, a shape of illumination other than a straight line is used. For example, in some cases: (a) the pattern is formed by a laser using a special lens (variation of Powell lens); (b) a light source projects a line to a non-flat mirror (e.g. a spherical or parabolic mirror); or (c) the light source comprises LED lights that are arranged in a spherical, circular, elliptical, parabolic or hyperbolic shape, and that project a curved surface.

In some implementations of the system, the system operates either in realtime mode (with different pixel modulation signals), or in high-res mode. In high-res mode, the scanning process consists of multiple exposures and laser sweeps in succession. In every exposure, the Control units apply the modulation signals to whole image sensor. The multiple pixel values consists of values captured in succession. This allows to compute the time t of the light peak and appropriate 3D point for every pixel in the image sensor.

In some implementations of the invention, the system uses different coding strategies to encode the time of pixel illumination alongside Gray codes. In a preferred embodiment, the control units creates a set of periodic sinusoidal functions with equal period and different phase shift (e.g. 4 sinusoidal functions shifted by $\pi/2$ rad each after another). The set of modulation function (phase shifting modulation functions) is applied to appropriate number of image sets (in some cases, multiple image sets are modulated by the same function to collect more samples). The corresponding pixel sets (and the corresponding pixels in every superpixels) are phase shifting pixels (for the simplicity of description). The number of periods of the modulation functions increase the possible accuracy of the coding. In general, the period of the function has to be at least 2 times longer that the time period $T_s$ the laser line needs to swipe through the area of projection of individual pixels of the sensor.

In some implementations, the distance to measured surface does not affect time $T_s$. While the time period $T_s$ is short (due to given constraints), the received illumination (the collected pixel intensity), the values of phase shifting pixels in superpixels, encodes the phase (the position inside the period). While the coding uses periodic function, the algorithm computes the index of period from the Gray coded pixels (the index time period $T_i$ is shorter than the period of the used sinusoidal functions). In some implementations, the system uses 4 sinusoidal functions shifted by $\pi/2$ rad each after another. The values of corresponding phase shifting pixels are A0, A1, A2, A3. The algorithm computes the phase value $\varphi$ using the following equation:

$$\varphi = \text{atan2}(A0 - A2, A1 - A3)$$

$$\text{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases}$$

The time t of the light peak is delivered as:

$$t = \text{PeriodIndex} * T_{period} + [(\varphi+\pi)/(2*\pi)] * T_{period}$$

where $T_{period}$ is the length of the period of the sinusoidal function, and the PeriodIndex is the index of the period derived from time period $T_i$.

In some implementations, the system uses phase shifting modulation functions with different period. For example, first set of phase shifting modulation signal have period of the same length as the exposure T, the second set has period of T/256. The algorithm decodes the phase value of the light peak (the time, when the laser sweeps across the projection of the individual pixel of the sensor) for both sets. The second phase value represents accurate measurement of the time of the occurrence of the light peak (up to the period index), the first phase value represents unambiguous measurement (Because of the physical limitations of the sensor, such measurement is in the most cases less accurate, than the one from multiple periods phase shifting modulation functions), which the algorithm uses to set the right period index.

In some implementations, the system uses different modulation functions (e.g. square waves).

In some implementations of the system, the pixels comprises multiple storages. The modulation signals controls the allocation of the accumulated photo-electrons to different storages. This allows for capturing multiple phase shifting values in single pixel.

Computers

In exemplary implementations of this invention, one or more electronic computers (e.g. 2803, 2805) are programmed and specially adapted: (1) to control the operation of, or interface with, hardware components of an imaging system, including by modulating the transfer of charge in a pixel photodiode to one or more storage devices, and for controlling a reflective or transmissive SLM to control intensity of light incident on image sensor pixels; (2) to control the operation of, or interface with, hardware components of a 3D scanning system, including an illumination subsystem and a camera subsystem; (3) to process data captured by an image sensor; (4) to perform triangulation to reconstruct 3D surface geometry; (5) to perform calibration, including calibration of any camera or light source; (6) to output modulation signals for modifying the response of pixels to incident light; (7) to output control signals to synchronize illumination of a scene with modulation of pixels; (8) to perform any other calculation, computation, program, algorithm, computer function or computer task described or implied above, including any optimization algorithm; (9) to receive signals indicative of human input; (10) to output signals for controlling transducers for outputting information in human perceivable format; and (11) to process data, to perform computations, to execute any algorithm or software, and to control the read or write of data to and from memory devices. The one or more computers may be in any position or positions within or outside of a 3D scanning system or imaging system. For example, in some cases (a) at least one computer is housed in or together with other components of the system, and (b) at least one computer is remote from other components of the system. The one or more computers are connected to each other or to other components in the system either: (a) wirelessly, (b) by wired connection, or (c) by a combination of wired and wireless connections.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more a tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of an imaging system, including by modulating the transfer of charge in a pixel photodiode to one or more storage devices, and for controlling a reflective or transmissive SLM to control intensity of light incident on image sensor pixels; (2) to control the operation of, or interface with, hardware components of a 3D scanning system, including an illumination subsystem and a camera subsystem; (3) to process data captured by an image sensor; (4) to perform triangulation to reconstruct 3D surface geometry; (5) to perform calibration, including calibration of any camera or light source; (6) to output modulation signals for modifying the response of pixels to incident light; (7) to output control signals to synchronize illumination of a scene with modulation of pixels; (8) to perform any other calculation, computation, program, algorithm, computer function or computer task described or implied above, including any optimization algorithm; (9) to receive signals indicative of human input; (10) to output signals for controlling transducers for outputting information in human perceivable format; and (11) to process data, to perform computations, to execute any algorithm or software, and to control the read or write of data to and from memory devices.

Definitions

The terms "a" and "an", when modifying a noun, do not imply that only one of the noun exists.

To compute "based on" specified data means to perform a computation that takes the specified data as an input.

Here are some non-limiting examples of a "camera": (a) an optical instrument that records images; (b) a digital camera; (c) a video camera; (d) a camera that uses photographic film or a photographic plate; (e) a light field camera; (f) an imaging system, (g) a light sensor; (h) a time-of-flight camera; (h) apparatus that includes a light sensor or an array of light sensors; and (i) apparatus for gathering data about light incident on the apparatus. The term "camera" includes any computers that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. For example, in some cases, a "computer" comprises: (a) a central processing unit, (b) an ALU (arithmetic/logic unit), (c) a memory unit, and (d) a control unit that controls actions of other components of the computer so that encoded steps of a program are executed in a sequence. For example, in some cases, the term "computer" also includes peripheral units, including an auxiliary memory storage device (e.g., a disk drive or flash memory). However, a human is not a "computer", as that term is used herein.

"Defined Term" means a term or phrase that is set forth in quotation marks in this Definitions section.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

"Forward", in the context of an SLM, means to reflect light from the SLM or to transmit light that passes through the SLM.

"Forwarding rate" of an SLM pixel relative to an imaging pixel means a ratio of (a) intensity of light incident on an SLM pixel and (b) intensity of light that is incident on the imaging pixel and forwarded by the SLM pixel.

In the context of a camera (or components of the camera), "front" is optically closer to the scene being imaged, and "rear" is optically farther from the scene, during normal operation of the camera. In the context of a display device (or components of the display device), "front" is optically closer to a human viewer, and "rear" is optically farther from the viewer, when the viewer is viewing a display produced by the device during normal operation of the device. The "front" and "rear" of a display device continue to be the front and rear, even when no viewer is present.

"Herein" means in this document, including text, specification, claims, abstract, and drawings.

"Imaging pixel" means a component of an imaging sensor, which component takes measurements of intensity of light incident on a region of the imaging sensor, such that the intensity is measured for the entire region and is not separately measured for any subregion of the region.

"Imaging superpixel" means a set of imaging pixels, such that each imaging pixel in the set is a horizontal, vertical or diagonal neighbor of another imaging pixel in the set.

As used herein: (1) "implementation" means an implementation of the present invention; (2) "embodiment" means an embodiment of the present invention; (3) "case" means an implementation of the present invention; and (4) "use scenario" means a use scenario of the present invention.

The term "include" (and grammatical variations thereof) shall be construed as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density. In the case of a ratio of two intensities, both of the intensities in the ratio have the same SI units.

"I/O device" means an input/output device. For example, an I/O device includes any device for (a) receiving input from a human, (b) providing output to a human, or (c) both. For example, an I/O device includes a user interface, graphical user interface, keyboard, mouse, touch screen, microphone, handheld controller, display screen, speaker, or projector for projecting a visual display. Also, for example, an I/O device includes any device (e.g., button, dial, knob, slider or haptic transducer) for receiving input from, or providing output to, a human.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

As used herein, (i) a single scalar is not a "matrix", and (ii) one or more entries, all of which are zero (i.e., a so-called null matrix), is not a "matrix".

The "maximum dimension" of an object means the longest Euclidian distance between any two points on the exterior surface of the object.

To "multiply" includes to multiply by an inverse. Thus, to "multiply" includes to divide.

The term "n-ary" is defined elsewhere in this document.

Two pixels are "neighbors" if the two pixels are positioned such that (i) the two pixels are adjacent to each other in a matrix of pixels and (ii) no pixel is between the two pixels.

"Pixel set" means a set of pixels to which an identical modulation signal is applied.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

A "read-out frame" means a period of time that begins when an exposure of an imaging pixel to light starts and that ends when digital data is created that is indicative of charge accumulated during the exposure.

"Reflective SLM" means a device that (i) reflects light from the device, and (ii) attenuates the light, such that the amount of attenuation of a light ray incident at a point on a surface of the device depends on at least the 2D spatial position of the point on the surface.

To compute a term that "satisfies" an equation: (a) does not require that calculations involve terms, variables or operations that are in the equation itself, as long as a solution of the equation (subject to error, as described in part (b) of this sentence) is computed; and (b) includes computing a solution that differs from a correct solution of the equation by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a so-called empty set (i.e., a set with no elements) and does not include a set with only one element. Mentioning a first set and a second set does not, in and of itself, create any implication regarding whether or not the first and second sets overlap (that is, intersect).

The term "signal generator" includes any signal generator, function generator, digital pattern generator, frequency generator and any other electronic device that generates repeating or non-repeating electrical signals, including either digital or analog signals.

"Some" means one or more.

A "spatial light modulator", also called an "SLM", means a device that (i) transmits light through the device or reflects light from the device, and (ii) attenuates the light, such that the amount of attenuation of a light ray incident at a point on a surface of the device depends on at least the 2D spatial position of the point on the surface.

A non-limiting example of changing the "sensitivity" of an imaging pixel is to change the state of a circuit so as to control which storage device, out of a set of storage devices, receives a particular electric charge, which electric charge (i) accumulated in a photodiode of the imaging pixel and (ii) will not be and has not been transferred to or from any other storage device in the set.

To say that a set of signals is "separate" means that no signal in the set is a function of any other signal in the set.

A "storage device" means any device for storing electric charge, including a capacitor, floating diffusion or capacitive bin.

"Subregion" of a first region means a part, but not all, of the first region.

As used herein, a "subset" of a set consists of less than all of the elements of the set.

"Substantially" means at least ten percent. For example: (a) 112 is substantially larger than 100; and (b) 108 is not substantially larger than 100.

To say that a thing is "substantially constant" means that the thing has a value that is always within a single range, such that: (a) the lowest value in the range is equal to a constant number minus ten percent of the constant number; and (b) the highest value in the range is equal to the constant number plus ten percent of the constant number.

The term "such as" means for example.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

"Transmissive SLM" means a device that (i) transmits light through the device, and (ii) attenuates the light, such that the amount of attenuation of a light ray incident at a point on a surface of the device depends on at least the 2D spatial position of the point on the surface.

A matrix may be indicated by a bold capital letter (e.g., D). A vector may be indicated by a bold lower case letter (e.g., a). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

Variations:

This invention may be implemented in many different ways.

No claims are made in this section entitled "Variations". For example, no claims are made in paragraphs [A] to [BR] below. Instead, this section entitled "Variations" helps to support claims.

Paragraphs [A] to [BR] below are descriptions of non-limiting examples of illustrative implementations of this invention

[A] A method comprising simultaneously modulating a plurality of imaging pixels in an imaging superpixel by a set of separate modulation signals, such that each imaging pixel in the imaging superpixel is modulated by a modulation signal that causes sensitivity of the imaging pixel to vary over time.

[B] The method of paragraph [A], wherein: (a) the modulation signals each consist of a temporal sequence of modulation states; and (b) the number of times that each specific modulation state occurs, and the order in which the modulation states occur, varies from modulation signal to modulation signal.

[C] The method of paragraph [A], wherein the set of modulation signals, taken together, comprise a code, each of the modulation signals representing a digit of the code.

[D] The method of paragraph [C], wherein the code is a binary code and each of the modulations signals represents a bit of the code.

[E] The method of paragraph [C], wherein the code is a binary gray code.

[F] The method of paragraph [C], wherein the code is a 9-bit binary gray code.

[G] The method of paragraph [C], wherein the code is an n-ary code.

[H] The method of paragraph [A], wherein: (a) the modulating occurs during a readout-frame, which readout-frame includes an exposure period; and (b) each imaging pixel in the imaging superpixel includes a photodiode that, during the exposure period, transfers electric charge to only one storage device, such that at multiple times during the exposure period, electric charge is transferred from the photodiode to the storage device.

[I] The method of paragraph [H], wherein, at multiple other times during the exposure period, electric charge is drained from the photodiode, without being saved for later readout.

[J] The method of paragraph [H], wherein, during the exposure period, the storage device receives electric charge only from the photodiode.

[K] The method of paragraph [A], wherein: (a) the modulating occurs during a readout-frame, which readout-frame includes an exposure period; and (b) each imaging pixel in the imaging superpixel includes a photodiode that, at multiple times during the exposure period, transfers electric charge to a set of storage devices, such that: (i) at any given time at which a transfer of electric charge from the photodiode to a storage device occurs, electric charge is being transferred to only one of the storage devices, and electric charge is not being transferred to any other storage device, and (ii) electric charge is transferred from the photodiode to each of the storage devices during the exposure period.

[L] The method of paragraph [K], wherein, during the exposure period, the storage devices receive electric charge only from the photodiode.

[M] A method comprising simultaneously: (a) modulating a plurality of imaging pixels in an imaging superpixel by a set of separate modulation signals, such that each imaging pixel in the imaging superpixel is modulated by a modulation signal that causes sensitivity of the imaging pixel to vary over time; and (b) using one or more light sources to illuminate a scene by a pattern of light that changes over time.

[N] The method of paragraph [M], wherein: (a) the modulation signals each consist of a temporal sequence of modulation states; and (b) the number of times that each specific modulation state occurs, and the order in which the modulation states occur, varies from modulation signal to modulation signal.

[O] The method of paragraph [M], wherein the pattern of light changes in at least intensity over time.

[P] The method of paragraph [M], wherein the pattern of light changes in at least direction or position, relative to the scene, over time.

[Q] The method of paragraph [M], wherein the pattern of light changes in at least polarization over time.

[R] The method of paragraph [M], wherein the pattern of light changes in at least wavelength or electromagnetic spectrum over time.

[S] The method of paragraph [M], wherein: (a) the pattern of light sweeps across a scene, such that a point in the scene, when directly illuminated by the pattern of light, reflects light directly to the imaging superpixel; (b) the method further comprises using one or more computers to process data indicative of measurements recorded by the imaging superpixel and, based in part on the data, to calculate 3D spatial coordinates of the point.

[T] The method of paragraph [S], wherein the pattern of light comprises a plane of laser light.

[U] The method of paragraph [S], wherein the method includes using a galvanometer-actuated mirror to sweep a plane of laser light across a scene.

[V] The method of paragraph [S], wherein, when calculating 3D spatial coordinates of the point, the computer performs an algorithm that either: (a) involves triangulation; or (b) involves accessing data that was calculated by a computer using an algorithm that involves triangulation.

[W] The method of paragraph [M], wherein the set of modulation signals, taken together, comprise a code, each of the modulation signals representing a digit of the code.

[X] The method of paragraph [W], wherein the code is a binary code and each of the modulation signals represents a bit of the code.

[Y] The method of paragraph [W], wherein the code is a binary gray code.

[Z] The method of paragraph [W], wherein the code is a 9-bit binary gray code.

[AA] The method of paragraph [W], wherein at different times during each sweep of the pattern of light across the scene, the modulation signals, taken together, represent different permutations of the code.

[AB] The method of paragraph [W], wherein the modulation signals, taken together, represent each of the permutations of the code at different times during an entire sweep of the pattern of light across the scene, one permutation at a time.

[AC] The method of paragraph [W], wherein: (a) each entire sweep of the pattern of light across the scene occurs in a time period, which time period consists of a set of subintervals, the total number of subintervals being equal to the number of permutations of the code; (b) during each subinterval, the modulation signals, taken together, represent only one of the permutations of the code; (c) intensity of light incident on the imaging superpixel reaches a maximum value for the entire sweep during a specific subinterval; and (d) a computer analyzes data indicative of measurements taken by imaging pixels of the imaging superpixel and, based on that data, determines the permutation of the code represented by the modulation signals during the specific subinterval.

[AD] The method of paragraph [M], wherein: (a) the modulating occurs during a readout-frame, which readout-frame includes an exposure period; and (b) each imaging pixel in the imaging superpixel includes a photodiode that, during the exposure period, transfers electric charge to only one storage device, such that at multiple times during the exposure period, electric charge is transferred from the photodiode to the storage device.

[AE] The method of paragraph [AD], wherein, at multiple other times during the exposure period, electric charge is drained from the photodiode, without being saved for later readout.

[AF] The method of paragraph [AD], wherein, during the exposure period, the storage device receives electric charge only from the photodiode.

[AG] The method of paragraph [M], wherein: (a) the modulating occurs during a readout-frame, which readout-frame includes an exposure period; and (b) each imaging pixel in the imaging superpixel includes a photodiode that, at multiple times during the exposure period, transfers electric charge to a set of storage devices, such that: (i) at any given time at which a transfer of electric charge from the photodiode to a storage device occurs, electric charge is being transferred to only one of the storage devices, and electric charge is not being transferred to any other storage device, and (ii) electric charge is transferred from the photodiode to each of the storage devices during the exposure period.

[AH] The method of paragraph [AG], wherein, during the exposure period, the storage devices receive electric charge only from the photodiode.

[AI] A system comprising, in combination: (a) a camera, which camera includes an imaging superpixel; and (b) one or more signal generators for producing a set of separate modulation signals, such that each imaging pixel in the imaging superpixel is modulated by a modulation signal that causes sensitivity of the imaging pixel to vary over time.

[AJ] The system of paragraph [AI], wherein: (a) the modulation signals each consist of a temporal sequence of modulation states; and (b) the number of times that each specific modulation state occurs, and the order in which the modulation states occur, varies from modulation signal to modulation signal.

[AK] The system of paragraph [AI], wherein the set of modulation signals, taken together, comprise a code, each of the modulation signals representing a digit of the code.

[AL] The system of paragraph [AI], wherein the code is a binary code and each of the modulations signals represents a bit of the code.

[AM] The system of paragraph [AI], wherein the code is a binary gray code.

[AN] The system of paragraph [AI], wherein the code is a 9-bit binary gray code.

[AO] The system of paragraph [AI], wherein the code is an n-ary code.

[AP] A system comprising, in combination: (a) a camera, which camera includes an imaging superpixel; (b) one or more signal generators for producing a set of separate modulation signals, such that (i) each imaging pixel in the imaging superpixel is modulated by a modulation signal that causes sensitivity of the imaging pixel to vary over time, and (ii) a modulation signal, out of the set of modulation signals, causes each photodiode in the superpixel, at multiple times during an exposure period of a read-out frame, to transfer electric charge from the photodiode to only one storage device, which storage device does not receive electric charge from any other photodiode during the exposure period.

[AQ] A system comprising, in combination: (a) a camera, which camera includes an imaging superpixel; and (b) one or more signal generators for producing a set of separate modulation signals, such that (i) each imaging pixel in the imaging superpixel is modulated by a modulation signal that causes sensitivity of the imaging pixel to vary over time, and (ii) a modulation signal, out of the set of modulation signals, causes each photodiode in the superpixel, at multiple times during an exposure period of a read-out frame, to transfer electric charge from the photodiode to a set of storage devices, such that (1) at any given time at which a transfer of electric charge from the photodiode to a storage device occurs, electric charge is being transferred to only one of the storage devices, and electric charge is not being transferred to any other storage device, and (2) electric charge is transferred from the photodiode to each of the storage devices during the exposure period.

[AR] A system comprising, in combination: (a) a camera, which camera includes an imaging superpixel; (b) one or more light sources for illuminating a scene by a pattern of light that changes over time; and (c) one or more signal generators for producing a set of separate modulation signals, such that each imaging pixel in the imaging superpixel is modulated by a modulation signal that causes sensitivity of the imaging pixel to vary over time.

[AS] A system comprising, in combination: (a) a camera, which camera includes an imaging superpixel; (b) one or more light sources for illuminating a scene by a pattern of light that sweeps across the scene, such that a point in the scene, when directly illuminated by the pattern of light, reflects light directly to the imaging superpixel; and (c) one or more signal generators for producing a set of separate modulation signals that occur while the scene is illuminated by the pattern of light, such that each imaging pixel in the imaging superpixel is modulated by a modulation signal that causes sensitivity of the imaging pixel to vary over time; and (d) one or more computers for processing data indicative of measurements recorded by the imaging superpixel and for calculating, based on this data, 3D spatial coordinates of the point, by performing an algorithm that either (i) involves triangulation; or (ii) involves accessing data that was calculated by a computer using an algorithm that involves triangulation.

[AT] A system comprising, in combination: (a) a camera, which camera includes an imaging superpixel; and (b) one or more light sources for illuminating a scene by a pattern of light that sweeps across the scene, such that a point in the scene, when directly illuminated by the pattern of light, reflects light directly to the imaging superpixel; (c) one or more signal generators for producing a set of separate modulation signals, such that (i) each imaging pixel in the imaging superpixel is modulated by a modulation signal that causes sensitivity of the imaging pixel to vary over time; (ii) the set of modulation signals, taken together, comprise a code, each of the modulation signals representing a digit of the code. (iii) each entire sweep of the pattern of light across the scene occurs in a time period, which time period consists of a set of subintervals, the total number of subintervals being equal to the number of permutations of the code; (iv) during each subinterval, the modulation signals, taken together, represent only one of the permutations of the code; (v) intensity of light incident on the imaging superpixel reaches a maximum value for the entire sweep during a specific subinterval; and (d) one or more computers for (i)

processing data indicative of measurements recorded by the imaging superpixel, (ii) calculating the permutation of the code represented by the modulation signals during the specific subinterval, and (iii) calculating 3D spatial coordinates of the point.

[AU] A method comprising simultaneously modulating a plurality of SLM pixels in an SLM by a set of separate modulation signals, wherein: (a) the plurality of SLM pixels are optically aligned with an imaging superpixel, such that each respective SLM pixel, in one or more states of the respective SLM pixel, forwards light to an imaging pixel in the imaging superpixel; (b) each respective SLM pixel in the SLM is modulated by a modulation signal, out of the set of modulation signals, that causes a forwarding rate of the respective SLM pixel relative to a imaging pixel to vary over time; (c) the set of modulation signals, taken together, comprise a code, each of the modulation signals representing a digit of the code; (d) at any given time during the modulating, the modulation signals, taken together, represent only one of the permutations of a code; (e) the modulation signals, taken together over a time period that spans at least a portion of the modulating, comprise a temporal sequence of all of the permutations of the code.

[AV] The method of paragraph [AU], wherein the light that is forwarded comprises light reflected by the SLM.

[AW] The method of paragraph [AV], wherein the SLM comprises a digital micromirror device.

[AX] The method of paragraph [AV], wherein the SLM comprises a reflective liquid-crystal-on-silicon device.

[AY] The method of paragraph [AU], wherein the light that is forwarded comprises light that passes through the SLM.

[AZ] The system of paragraph [AY], wherein the SLM comprises a liquid crystal display device.

[BA] A system comprising (a) an SLM; and (b) a camera that includes an imaging superpixel; wherein (i) the plurality of SLM pixels are optically aligned with an imaging superpixel, such that each respective SLM pixel, in one or more states of the respective SLM pixel, forwards light to an imaging pixel in the imaging superpixel; (ii) the plurality of SLM pixels are modulated by a set of separate modulation signals, such that (1) each respective SLM pixel in the SLM is modulated by a specific modulation signal, out of the set of modulation signals, which specific modulation signal causes a forwarding rate of the respective SLM pixel relative to a imaging pixel to vary over time; (2) the set of modulation signals, taken together, comprise a code, each of the modulation signals representing a digit of the code, (3) at any given time during the modulating, the modulation signals, taken together, represent only one of the permutations of a code, and (4) the modulation signals, taken together over a time period that spans at least a portion of the modulating, comprise a temporal sequence of all of the permutations of the code; and (vi) the system also includes a signal generator for producing the set of modulation signals.

[BB] The system of paragraph [BA], wherein the light that is forwarded comprises light reflected by the SLM.

[BC] The system of paragraph [BB], wherein the SLM comprises a digital micromirror device.

[BD] The system of paragraph [BB], wherein the SLM comprises a reflective liquid-crystal-on-silicon device.

[BE] The system of paragraph [BA], wherein the light that is forwarded comprises light that passes through the SLM.

[BF] The system of paragraph [BE], wherein the SLM comprises a liquid crystal display device.

[BG] A system comprising, in combination: (a) a camera, which camera includes an imaging superpixel; and (b) one or more computers that are programmed to output a set of separate modulation signals, such that each imaging pixel in the imaging superpixel is modulated by a modulation signal that causes sensitivity of the imaging pixel to vary over time.

[BH] The system of paragraph [BG], wherein: (a) the modulation signals each consist of a temporal sequence of modulation states; and (b) the number of times that each specific modulation state occurs, and the order in which the modulation states occur, varies from modulation signal to modulation signal.

[BI] The system of paragraph [BG], wherein the set of modulation signals, taken together, comprise a code, each of the modulation signals representing a digit of the code.

[BJ] The system of paragraph [BG], wherein the code is a binary code and each of the modulations signals represents a bit of the code.

[BK] The system of paragraph [BG], wherein the code is a binary gray code.

[BL] The system of paragraph [BG], wherein the code is a 9-bit binary gray code.

[BM] The system of paragraph [BG], wherein the code is an n-ary code.

[BN] A system comprising, in combination: (a) a camera, which camera includes an imaging superpixel; (b) one or more computers that are programmed to output a set of separate modulation signals, such that (i) each imaging pixel in the imaging superpixel is modulated by a modulation signal that causes sensitivity of the imaging pixel to vary over time, and (ii) a modulation signal, out of the set of modulation signals, causes each photodiode in the superpixel, at multiple times during an exposure period of a read-out frame, to transfer electric charge from the photodiode to only one storage device, which storage device does not receive electric charge from any other photodiode during the exposure period.

[BO] A system comprising, in combination: (a) a camera, which camera includes an imaging superpixel; and (b) one or more computers that are programmed to output a set of separate modulation signals, such that (i) each imaging pixel in the imaging superpixel is modulated by a modulation signal that causes sensitivity of the imaging pixel to vary over time, and (ii) a modulation signal, out of the set of modulation signals, causes each photodiode in the superpixel, at multiple times during an exposure period of a read-out frame, to transfer electric charge from the photodiode to a set of storage devices, such that (1) at any given time at which a transfer of electric charge from the photodiode to a storage device occurs, electric charge is being transferred to only one of the storage devices, and electric charge is not being transferred to any other storage device, and (2) electric charge is transferred from the photodiode to each of the storage devices during the exposure period.

[BP] A system comprising, in combination: (a) a camera, which camera includes an imaging superpixel; (b) one or more light sources for illuminating a scene by a pattern of light that changes over time; and (c) one or more signal generators for producing a set of separate modulation signals, such that each imaging pixel in the imaging superpixel is modulated by a modulation signal that causes sensitivity of the imaging pixel to vary over time.

[BQ] A system comprising, in combination: (a) a camera, which camera includes an imaging superpixel; (b) one or more light sources for illuminating a scene by a pattern of light that sweeps across the scene, such that a point in the scene, when directly illuminated by the pattern of light, reflects light directly to the imaging superpixel; and (c) one or more computers that are programmed to output a set of separate modulation signals that occur while the scene is illuminated by the pattern of light, such that each imaging pixel in the imaging superpixel is modulated by a modulation signal that causes sensitivity of the imaging pixel to vary over time; and (d) one or more computers for processing data indicative of measurements recorded by the imaging superpixel and for calculating, based on this data, 3D spatial coordinates of the point, by performing an algorithm that either (i) involves triangulation; or (ii) involves accessing data that was calculated by a computer using an algorithm that involves triangulation.

[BR] A system comprising, in combination: (a) a camera, which camera includes an imaging superpixel; and (b) one or more light sources for illuminating a scene by a pattern of light that sweeps across the scene, such that a point in the scene, when directly illuminated by the pattern of light, reflects light directly to the imaging superpixel; (c) one or more computers that are programmed to output a set of separate modulation signals, such that (i) each imaging pixel in the imaging superpixel is modulated by a modulation signal that causes sensitivity of the imaging pixel to vary over time; (ii) the set of modulation signals, taken together, comprise a code, each of the modulation signals representing a digit of the code. (iii) each entire sweep of the pattern of light across the scene occurs in a time period, which time period consists of a set of subintervals, the total number of subintervals being equal to the number of permutations of the code; (iv) during each subinterval, the modulation signals, taken together, represent only one of the permutations of the code; (v) intensity of light incident on the imaging superpixel reaches a maximum value for the entire sweep during a specific subinterval; and (d) one or more computers for (i) processing data indicative of measurements recorded by the imaging superpixel, (ii) calculating the permutation of the code represented by the modulation signals during the specific subinterval, and (iii) calculating 3D spatial coordinates of the point.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed:

1. A method comprising modulating, by a set of signals, a group of imaging pixels, wherein:
   (a) the modulating comprises, for each respective imaging pixel, modulating sensitivity of the respective imaging pixel to light incident on the respective imaging pixel, in such a way that the sensitivity varies over time during the modulating;
   (b) the group of imaging pixels consists of pixel sets, each imaging pixel being a member of one or more of the pixel sets;
   (c) the imaging pixels are located in imaging superpixels;
   (d) each imaging superpixel includes at least one imaging pixel from each of the pixel sets;
   (e) each respective signal, in the set of signals, modulates only one pixel set and thus modulates at least one imaging pixel in each of the imaging superpixels; and
   (f) each signal, in the set of signals, is different than the other signals in the set of signals.

2. The method of claim 1, wherein the modulating by each of the signals occurs simultaneously.

3. The method of claim 1, wherein each imaging pixel is a member of only one of the pixel sets.

4. The method of claim 1, wherein each imaging superpixel includes only one imaging pixel of each pixel set, respectively.

5. The method of claim 1, wherein:
   (a) each signal, in the set of signals, undergoes a temporal sequence of states; and
   (b) the frequency at which the states change is different for each signal in the set of signals.

6. The method of claim 1, wherein:
   (a) each signal, in the set of signals, undergoes a temporal sequence of states; and
   (b) different permutations of the states of the signals exist at different times during a temporal period, each permutation of the states, respectively, during the period representing a permutation of digits of a code.

7. The method of claim 1, wherein the method further comprises, for each respective imaging pixel:
   (a) at multiple times during a temporal period, transferring electric charge from a photodiode of the respective imaging pixel to a first storage device;
   (b) at multiple other times during the period, discharging accumulated electrical charge from the photodiode without measuring the accumulated electrical charge; and
   (c) throughout the period, not transferring electrical charge from the photodiode to any storage device other than the first storage device.

8. The method of claim 1, wherein the method further comprises, for each respective imaging pixel, transferring, at multiple times during a read-out frame, electric charge from a photodiode of the respective imaging pixel to a set of storage devices, one storage device at a time.

9. The method of claim 1, wherein:
   (a) each signal, in the set of signals, undergoes a temporal sequence of states; and
   (b) the method further comprises
      (i) illuminating a scene, in such a way that where intensity of light incident on the scene is greatest changes during a temporal period, and
      (ii) calculating, based on a permutation, a time at which intensity of light incident on a specific imaging superpixel is greatest during the period, the permutation being a permutation of states of the signals that occurs when intensity of light incident on the specific imaging superpixel is greatest during the period.

10. The method of claim 9, further comprising calculating, based on the time, 3D position of a point in the scene, which point in the scene corresponds to the specific imaging superpixel.

11. An apparatus comprising:
   (a) a group of imaging pixels; and
   (b) one or more signal generators;
   wherein
   (i) the group of imaging pixels consists of pixel sets, each imaging pixel being a member of one or more of the pixel sets,
   (ii) the imaging pixels are spatially arranged as, and comprise, imaging superpixels, (iii) each imaging superpixel includes at least one imaging pixel from each of the pixel sets, and
(iv) the one or more signal generators are configured to output a set of signals that cause the group of imaging pixels to undergo modulation, in such a way that
   (A) each signal, in the set of signals, is different than the other signals in the set of signals,
   (B) the modulation comprises, for each respective imaging pixel, modulating sensitivity of the respective imaging pixel to light incident on the respective imaging pixel, in such a way that the sensitivity varies over time during the modulation, and
   (C) each respective signal, in the set of signals, modulates only one pixel set and thus modulates at least one imaging pixel in each of the imaging superpixels.

12. The apparatus of claim 11, wherein the signal generator is configured to output each of the signals simultaneously.

13. The apparatus of claim 11, wherein each imaging pixel is a member of only one of the pixel sets.

14. The apparatus of claim 11, wherein each imaging superpixel includes only one imaging pixel of each pixel set, respectively.

15. The apparatus of claim 11, wherein an imaging pixel, in the group of imaging pixels, comprises a CMOS pixel.

16. The apparatus of claim 11, wherein an imaging pixel, in the group of imaging pixels, comprises a CCD pixel.

17. The apparatus of claim 11, wherein:
(a) each imaging pixel, respectively, includes a photodiode and a first storage device; and
(b) the apparatus is configured to cause the photodiode
   (a) at multiple times during a temporal period, to transfer electric charge to the first storage device;
   (b) at multiple other times during the period, to discharge accumulated electrical charge without the accumulated electrical charge being measured; and
   (c) throughout the period, to not transfer electrical charge to any storage device other than the first storage device.

18. The apparatus of claim 11, wherein:
(a) each imaging pixel, respectively, includes a photodiode and a set of storage devices; and
(b) the apparatus is configured to cause the photodiode to transfer, at multiple times during a read-out frame, electric charge to the set of storage devices, one storage device at a time.

19. The apparatus of claim 11, wherein
(a) the one or more signal generators are configured to output the set of signals in such a way that each signal, in the set of signals, undergoes a temporal sequence of states; and
(b) the apparatus further comprises:
   (i) a light source configured to illuminate a scene, in such a way that where intensity of light incident on the scene is greatest changes during a temporal period, and
   (ii) a computer that is programmed to calculate, based on a permutation, a time at which intensity of light incident on a specific imaging superpixel is greatest during the period, the permutation being a permutation of states of the signals that occurs when intensity of light incident on the specific imaging superpixel is greatest during the period.

20. The apparatus of claim 19, wherein the computer is programmed to calculate, based on the time, 3D position of a point in the scene, which point in the scene corresponds to the specific imaging superpixel.

* * * * *

UNITED STATES PATENT AND TRADEMARK OFFICE
CERTIFICATE OF CORRECTION

PATENT NO. : 10,334,190 B2
APPLICATION NO. : 15/871444
DATED : June 25, 2019
INVENTOR(S) : Tomas Kovacovsky et al.

It is certified that error appears in the above-identified patent and that said Letters Patent is hereby corrected as shown below:

On the Title Page

Item (73):
Photoneo, s.r.o.
Should read:
Photoneo s.r.o.

Signed and Sealed this
Twenty-first Day of April, 2020

Andrei Iancu
*Director of the United States Patent and Trademark Office*